United States Patent
Pettit

(10) Patent No.: US 12,309,196 B2
(45) Date of Patent: May 20, 2025

(54) IDENTIFYING DENIAL-OF-SERVICE ATTACKS

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 134 days.

(21) Appl. No.: 18/033,725

(22) PCT Filed: Sep. 28, 2021

(86) PCT No.: PCT/EP2021/076686
§ 371 (c)(1),
(2) Date: Apr. 25, 2023

(87) PCT Pub. No.: WO2022/089865
PCT Pub. Date: May 5, 2022

(65) Prior Publication Data
US 2023/0319103 A1    Oct. 5, 2023

(30) Foreign Application Priority Data

Oct. 28, 2020 (GB) ..................................... 2017103

(51) Int. Cl.
*H04L 29/06* (2006.01)
*H04L 9/08* (2006.01)
(Continued)

(52) U.S. Cl.
CPC .......... *H04L 63/1458* (2013.01); *H04L 9/085* (2013.01); *H04L 9/3255* (2013.01)

(58) Field of Classification Search
None
See application file for complete search history.

(56) References Cited

U.S. PATENT DOCUMENTS

| 9,813,244 | B1 | 11/2017 | Triandopoulos et al. |
| 9,894,151 | B2 * | 2/2018 | Dhuse ................... H04L 9/3247 |

(Continued)

FOREIGN PATENT DOCUMENTS

| JP | 2007124032 A | 5/2007 |
| JP | 2008199278 A | 8/2008 |

(Continued)

OTHER PUBLICATIONS

Combined Search and Examination Report under Sections 17 and 18(3) for Application No. GB2111440.0 mailed on Jan. 25, 2022, 6 pages.

(Continued)

*Primary Examiner* — Maung T Lwin
(74) *Attorney, Agent, or Firm* — Messner Reeves LLP

(57) ABSTRACT

A computer-implemented method of identifying a denial-of-service attack during a threshold signature scheme, wherein each participant has respective shares of first and second shared secrets, wherein the method is performed by a first participant of the group and comprises: calculating a first target share; calculating a target value based on the first target share and a first predetermined amount of other target shares; calculating a target public key corresponding to the target value; calculating a first verification share based on the first share of the first shared secret and a public key corresponding to the second shared secret; calculating a verification public key based on at least the first verification share and a second predetermined amount of other verification shares; and determining whether at least one other participant is attempting a denial-of-service attack based on whether the verification public key matches the target public key.

19 Claims, 3 Drawing Sheets

(51) Int. Cl.
  *H04L 9/32* (2006.01)
  *H04L 9/40* (2022.01)

(56) References Cited

U.S. PATENT DOCUMENTS

| | | | |
|---|---|---|---|
| 10,764,043 B2* | 9/2020 | Traynor | H04L 9/3263 |
| 11,973,867 B2 | 4/2024 | Tysor et al. | |
| 2002/0116611 A1 | 8/2002 | Zhou et al. | |
| 2003/0009694 A1* | 1/2003 | Wenocur | H04L 63/0823 |
| | | | 713/176 |
| 2010/0037055 A1 | 2/2010 | Fazio et al. | |
| 2011/0138192 A1 | 6/2011 | Kocher et al. | |
| 2015/0100781 A1 | 4/2015 | Yann et al. | |
| 2018/0212772 A1 | 7/2018 | Leavy et al. | |
| 2018/0307573 A1 | 10/2018 | Abraham et al. | |
| 2019/0370792 A1 | 12/2019 | Lam | |
| 2019/0372759 A1 | 12/2019 | Rix | |
| 2020/0074450 A1 | 3/2020 | Fletcher et al. | |
| 2020/0213099 A1 | 7/2020 | Wright | |
| 2020/0311678 A1 | 10/2020 | Fletcher et al. | |
| 2020/0353167 A1* | 11/2020 | Vivek | H04L 9/3255 |
| 2022/0182235 A1 | 6/2022 | Tysor et al. | |
| 2022/0239509 A1 | 7/2022 | Jang et al. | |

FOREIGN PATENT DOCUMENTS

| | | |
|---|---|---|
| JP | 2015194959 A | 11/2015 |
| JP | 2018005089 A | 1/2018 |
| WO | 9937052 A1 | 7/1999 |
| WO | 2015160839 A1 | 10/2015 |
| WO | 2017145010 | 2/2017 |
| WO | 2018189656 A1 | 10/2018 |
| WO | 2019034951 A1 | 2/2019 |
| WO | 2019034986 | 2/2019 |
| WO | 2019158209 A1 | 8/2019 |
| WO | 2019193452 A1 | 10/2019 |
| WO | 2019246206 A1 | 12/2019 |
| WO | 2020084418 A1 | 4/2020 |
| WO | 2021213959 | 10/2021 |
| WO | 2021254702 | 12/2021 |
| WO | 2023072502 A1 | 5/2023 |

OTHER PUBLICATIONS

Combined Search and Examination Report under Sections 17 and 18(3) for Application No. GB2111441.8 mailed on Jan. 25, 2022, 6 pages.
Combined Search Report under Sections 17 for Application No. GB2111442.6 mailed on Jan. 25, 2022, 4 pages.
Dikshit P., et al., "Efficient Weighted Threshold ECDSA for Securing Bitcoin Wallet," 2017 ISEA Asia Security and Privacy (ISEASP), IEEE, Jan. 29, 2017, pp. 1-9, DOI: 10.1109/ISEASP.2017.7976994.
Ewa Syta et al: "Keeping Authorities "Honest or Bust" with Decentralized Witness Cosigning", 2016 IEEE Symposium on Security and Privacy (SP), May 1, 2016 (May 1, 2016), pp. 526-545.
Gennaro R., et al., "Fast Multiparty Threshold ECDSA with Fast Trustless Setup," Proceedings of the 2018 ACM SIGSAC Conference on Computerand Communications Security, Oct. 2018, pp. 1179-1194.
Gennaro R., et al., "Robust Threshold DSS Signatures," International Conference on the Theory and Applications of Cryptographic Techniques, 1996, Eurocrypt '96 pp. 354-371.
International Search Report and Written Opinion for Application No. PCT/EP2022/069246 mailed on Nov. 3, 2022, 15 pages.
International Search Report and Written Opinion for International Application No. PCT/EP2022/076636, mailed Jan. 20, 2023, 12 pages.

Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.
PCT/EP2021/076686 International Search Report and Written Opinion dated Feb. 14, 2022, 17 pages.
GB2017103.9 Combined Search and Examination Report dated Jun. 28, 2021, 13 pages.
Combined Search and Examination Report for Application No. GB2009062.7, mailed on Mar. 12, 2021,10 pages.
Combined Search and Examination Report under Sections 17 and 18(3) for Application No. GB2011686.9, mailed on Apr. 22, 2021, 10 pages.
Fornaro D., "Elliptic Curve Hierarchical Deterministic Private Key Sequences: Bitcoin Standards and Best Practices," Master Thesis, Apr. 19, 2018, retrieved from the URL: https://www.politesi.polimi.it/bitstream/10589/140112/1/2018_04_Fornaro.pdf, 53 pages.
Gennaro R., et al., "Robust Threshold DSS Signatures," International Conference on the Theory and Applications of Cryptographic Techniques, 2001, vol. 164, pp. 54-84.
Goldfeder S., et al., "Securing Bitcoin Wallets via Threshold Signatures," 2014, retrieved from the URL: https://www.cs.princeton.edu/stevenag/bitcoin_threshold_signatures.pdf, sections "Threshold ECDSA Signature Generation" and "Threshold Deterministic Address Derivation", 11 pages.
International Search Report and Written Opinion for Application No. PCT/EP2021/062941, mailed on Aug. 3, 2021, 14 pages.
International Search Report and Written Opinion issued in International Application No. PCT/EP2021/067673, mailed on Sep. 28, 2021, 13 pages.
Luzio A.D., et al., "Arcula: A Secure Hierarchical Deterministic Wallet for Multi-asset Blockchains," Section 2, Dec. 10, 2019, 33 pages.
Pramanik S., et al., "VPSS: A Verifiable Proactive Secret Sharing Scheme in Distributed Systems," IEEE Military Communications Conference, Milcom, Oct. 13, 2003, vol. 2, pp. 826-831, XP010698401, DOI: 10.1109/MILCOM.2003.1290219, ISBN: 978-0-7803-8140-7.
Cachin Christian, "Security and Fault-tolerance in Distributed Systems—Distributed Cryptography", Dec. 31, 2012 (Dec. 31, 2012), XP055903112, Retrieved from the Internet: URL: https://cachin.com/cc/sft12/distcrypto.pdf, sections 7.2, 7.3, 7.4.
Combined Search and Examination Report under Sections 17 and 18(3) for Application No. GB2105992.8 mailed on Jan. 17, 2022, 9 pages.
Damgard I., et al., "Fast Threshold ECDSA with Honest Majority", Aug. 23, 2020, Computer Vision—ECCV2020: 16th European Conference, Proceedings; Part of the Lecture Notes in Computer Science, 35 pages.
Denis Kolegov et al: "Towards Threshold Key Exchange Protocols", arxiv.org, Cornell University Library, 201 Olin Library Cornell University Ithaca, NY 14853, Dec. 27, 2020 (Dec. 27, 2020), XP081849900, section 2.2.
GB2101590.4 Combined Search and Examination Report dated Jul. 30, 2021,7 pages.
International Search Report and Written Opinion for Application No. PCT/EP2022/058085 mailed on Jul. 26, 2022, 14 pages.
Joonsang Baek et al: "Simple and efficient threshold cryptosystem from the gap diffie-hell ma n group", Globecom '03. 2003—IEEE Global Telecommunications Conference. Conference Proceedings. San Francisco, CA, Dec. 1-5, 2003; [IEEE Global Telecommunications Conference] New York, Ny, vol. 3, Dec. 1, 2003 (Dec. 1, 2003), pp. 1491-1495.
PCT/EP2022/050116 International Search Report and Written Opinion dated Apr. 26, 2022, 14 pages.
Pettit M. "Shared Secrets and Threshold Signatures," May 1, 2020, [retrieved on Jun. 14, 2021], pp. 1-23, Retrieved from the Internet: URL: https://nakasendoproject.org/Threshold-Signatures-whitepaper-nchain.pdf, sections 4 and 5; p. 22.

\* cited by examiner

IDENTIFYING DENIAL-OF-SERVICE ATTACKS

CROSS REFERENCE TO RELATED APPLICATIONS

This application is the U.S. National Stage of International Application No. PCT/EP2021/076686 filed on Sep. 28, 2021, which claims the benefit of United Kingdom Patent Application No. 2017103.9, filed on Oct. 28, 2020, the contents of which are incorporated herein by reference in their entireties.

TECHNICAL FIELD

The present disclosure relates to a method of identifying a denial-of-service attack during a threshold signature scheme.

BACKGROUND

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature on the message. Anyone with the signer's corresponding public key can use the same message and the digital signature on the message to verify whether the signature was validly created, i.e. whether the signature was indeed made using the signer's private key.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

A threshold signature scheme allows a threshold number of participants in a group to create a digital signature on (or of) a message using individual shares of a shared private key. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

A common feature of threshold signature shares is that if any of the private key shares are lost, the private key can still be recoverable provided that the threshold number of shares are still available.

One particular digital signature algorithm is the Elliptic Curve Digital Signature Algorithm (ECDSA). There are two common threshold schemes for ECDSA signature. One threshold ECDSA scheme is a non-optimal scheme where a group collectively own a shared private key with a threshold of t+1, but creating a signature requires a higher threshold of 2t+1. For a detailed description see Gennaro, R, et al., "Robust threshold DSS signatures", *International Conference on the Theory and Applications of Cryptographic Techniques*, Springer, Berlin, Heidelberg, 1996. This scheme is referred to below as the "non-optimal Gennaro scheme".

The other common threshold ECDSA scheme is an optimal scheme, where optimal means that the threshold to create a signature is the same as that of the shared private key. For a detailed description see Gennaro, R, and Goldfeder, S., "Fast multiparty threshold ECDSA with fast trustless setup", *Proceedings of the 2018 ACM SIGSAC Conference on Computer and Communications Security*, 2018. This scheme is referred to below as the "optimal Gennaro scheme".

SUMMARY

A third threshold ECDSA scheme was developed by Pettit, M and is described in GB2005953.1. It has the computational, storage, and communication advantages of the non-optimal Gennaro scheme, whilst crucially being threshold optimal, like the optimal Gennaro scheme. The details of this scheme are provided below.

Each of the three threshold signature schemes mentioned above (and threshold signature schemes in general) rely on the participation of at least some of a group of participants. A valid signature can only be generated if at least some of the group (i.e. a threshold number) of participants provides a valid signature share. If one or more participants provide an invalid (i.e. incorrectly calculated) signature share, then the resulting signature will also be invalid. A signature may be invalid in that it cannot be verified using a public key corresponding to the shared private key.

As part of calculating a respective signature share, each participant must use data provided by the other participants. Therefore a malicious participant of the group can choose to provide incorrect data in order to prevent one or more participants from calculating a respective valid signature share. In particular, a malicious participant may set up shared secrets (e.g. shared private keys) correctly and then send incorrect data that will result in incorrect values used in the signature. Previously, this would only be caught when an incorrect signature is calculated.

Depending on the use case, an invalid signature can have severe detrimental effects. In general, an invalid signature cannot be verified and thus a verifying party cannot verify that the signature generating party is the party who did indeed generate the signature. In the context of the blockchain, a valid signature is normally required to assign (e.g. spend) an unspent transaction output (UTXO) of a blockchain transaction. Therefore the UTXO cannot be assigned without a valid signature. As another example, a valid signature may be required in order to perform a vote, or similar events that requiring a certain number of participants to take action. Therefore a malicious party may prevent a vote from happening by denying the calculation of a valid signature.

In general, a malicious party may perform a denial-of-service attack by preventing a valid signature from being generated. It would therefore be desirable to be able to identify such denial-of-service attacks in order to the generation of invalid signatures in the first place.

According to one aspect disclosed herein, there is provided a computer-implemented method of identifying a denial-of-service attack during a threshold signature scheme, wherein each participant of a group of participants has a respective share of a first shared secret and a respective share of a second shared secret, wherein the method is performed by a first participant of the group and comprises: calculating a first target share based on at least a first share of the first shared secret and a first share of the second shared secret, wherein the first target share is used to calculate a first signature share of a threshold signature; calculating a target value based on the first target share and a first predetermined amount of other target shares, wherein each other target share is calculated by a respective participant; calculating a target public key corresponding to the target value; calculating a first verification share based on the first share of the first shared secret and a public key corresponding to the second shared secret; calculating a verification public key based on at least the first verification share and a second predetermined amount of other verification shares, wherein each other verification share is calculated by a respective participant; and determining whether at least one other participant is attempting a denial-of-service attack based on whether the verification public key matches the target public key.

If all participants are honest and have calculated their respective target shares correctly, then the verification public key should match (i.e. be equal to) to the target public key. If at least one participant is dishonest and has calculated an incorrect target share, then the verification public key and the target public key will not match. Therefore the honest participant(s) can identify an attempted denial-of-service attack and choose not to proceed further in the signature calculation using the target shares. This means that an invalid signature will not be calculated, this preventing negative consequences, e.g. those discussed above.

According to another aspect disclosed herein, there is provided a computer-implemented method of identifying a denial-of-service attack during a threshold signature scheme, wherein each participant of a group of participants has a respective share of a shared private key, a respective share of an ephemeral private key, a respective share of a first blinding key, and a respective share of a second blinding key, wherein the method is performed by a first participant of the group and comprises: calculating a first public key corresponding to a first inverse ephemeral private key share, wherein first public key is calculated based on i) an inverse of a product of the ephemeral private key and the first blinding key, and ii) a public key corresponding to a first share of the first blinding key; calculating a second public key corresponding to a pre-signature share, wherein the second public key is calculated based on i) a public key corresponding to an intermediary value and ii) a public key corresponding to a first share of the second blinding key, wherein the intermediary value is based on i) an inverse of the ephemeral private key, ii) the private key and iii) the second blinding key; and sending the first public key and the second public key to a coordinating party, wherein the coordinating party has access to a first signature share calculated by the first participant, and wherein the first signature share is calculated based on i) a first share of the ephemeral private key, ii) a message, iii) a public key corresponding to the shared private key, and iv) a first share of the second blinding key.

According to another aspect disclosed herein, there is provided a computer-implemented method of identifying a denial-of-service attack, wherein each participant of a group of participants has a respective share of a private key, a respective share of an ephemeral private key, a respective share of a first blinding key, and a respective share of a second blinding key, and wherein the method is performed by a coordinating party configured to generate a signature based on a threshold number of signature shares, and comprises: receiving a first public key from a first participant; receiving a second public key from the first participant; receiving a first signature share from the first participant; calculating a public key corresponding to a first candidate signature share based on i) the first public key, ii) a message, iii) a public key corresponding to the shared ephemeral private key, and iv) the second public key; and determining whether the first participant is attempting a denial-of-service attack based on whether a public key corresponding to the first signature share matches the public key corresponding to the first candidate signature share.

According to another aspect disclosed herein, there is provided a computer-implemented method of identifying a denial-of-service attack, wherein each participant of a group of participants has a respective share of a private key, a respective share of an ephemeral private key, a respective share of a first blinding key, and a respective share of a second blinding key, and wherein the method is performed by a coordinating party configured to generate a signature based on a threshold number of signature shares, and comprises: calculating a first public key corresponding to a first inverse ephemeral private key share of a first participant; calculating a second public key corresponding to a pre-signature share of the first participant; receiving a first signature share from the first participant; calculating a public key corresponding to a candidate first signature share based on i) the first public key, ii) a message, iii) a public key corresponding to the shared ephemeral private key, and iv) the second public key; and determining whether the first participant is attempting a denial-of-service attack based on whether a public key corresponding to the first signature share matches the public key corresponding to the candidate first signature share.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
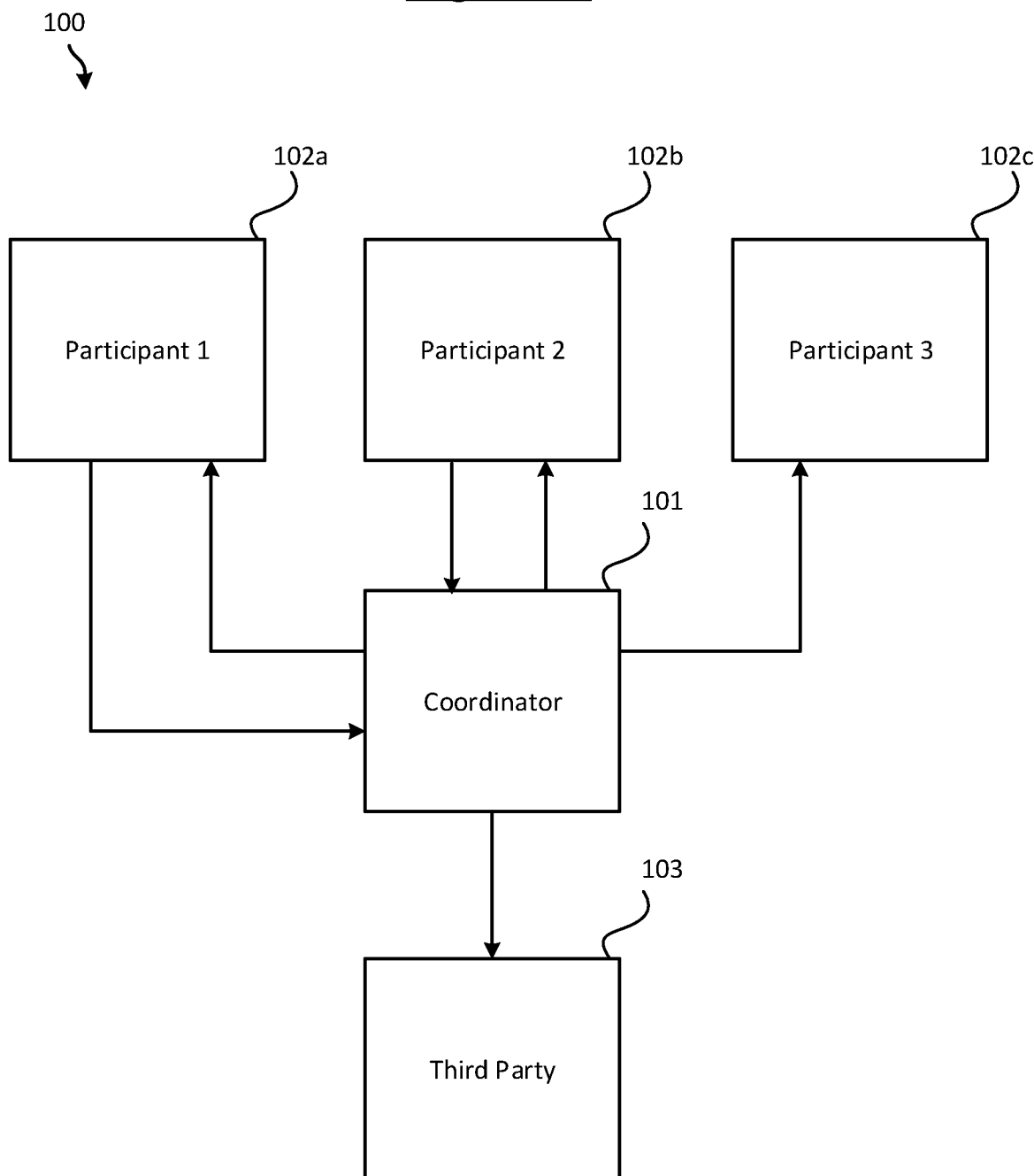
FIG. 1 schematically illustrates an example system for generating a signature of a message according to embodiments of the present invention, FIG. 2 schematically illustrates an example method for generating a signature share of a message according to embodiments of the present invention, and FIG. 3 schematically illustrates an example blockchain transaction protocol.

Cryptographic Preliminaries
Elliptic Curve Groups

An elliptic curve E satisfies the equation:

$y^2 = x^3 + ax + b \mod p$ where a, b∈ $\mathbb{Z}_p$ and a, b are constants satisfying $4a^3+27b^2\neq 0$. The group over this elliptic curve is defined to be the set of elements (x, y) satisfying this equation along with the point at infinity $\mathcal{O}$, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by ·. For a point G∈ $E(\mathbb{Z}_p)$ and a scalar k∈ $\mathbb{Z}_n^*$, the point k·G is defined to be the point G added to itself k times.

In elliptic curve cryptography, a private key is defined to be a scalar k∈ $\mathbb{Z}_n\backslash\{0\}$ where $\mathbb{Z}_n\backslash\{0\}$ is notation for the set {1, . . . , n−1}, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

Elliptic Curve Digital Signature Algorithm

In order to create a signature on a message msg, with the private key a, the following steps are taken:
1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer k∈ {1, . . . , n−1}, where n is the order of the elliptic curve, e.g. the secp256k1 curve. In the following, k is referred to as the ephemeral private key.
3. Calculate the ephemeral public key corresponding to this ephemeral private key k·G=($R_x$, $R_y$).
4. Calculate r=$R_x$ mod n. If r=0, return to step 2.
5. Calculate the multiplicative inverse of the ephemeral key $k^{-1}$ mod n.
6. Calculate s=$k^{-1}$(e+ar) mod n. If s=0, return to step 2.
7. The signature on the message msg is (r, s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key P=a·G, and corresponding signature (r, s), then one can verify the signature by completing the following steps:
1. Calculate the message digest e=hash(msg), e.g. e=SHA256(SHA256(msg)).
2. Calculate the multiplicative inverse $s^{-1}$ of s modulo n.
3. Calculate $j_1$=$es^{-1}$ mod n and $j_2$=$rs^{-1}$ mod n.
4. Calculate the point Q=$j_1$·G+$j_2$·P.
5. If Q=$\mathcal{O}$, the point at infinity, the signature is invalid.
6. If Q≠$\mathcal{O}$, then let Q:=($Q_x$, $Q_y$), and calculate u=$Q_x$ mod n. If u=r, the signature is valid.

In threshold signature schemes, this private key a is split into key shares that are distributed amongst participants in a threshold scheme group.

Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n\backslash\{0\}, \forall j=0, \ldots, t,$$

where $\in_R$ means a randomly generated element of the set $\mathbb{Z}_n\backslash\{0\}$ where $\mathbb{Z}_n\backslash\{0\}$ is notation for the set {1, . . . , n−1}. Then each participant has a secret polynomial of order t $$f_i(x)=a_{i0}+a_{i1}x+ \ldots +a_{it}x^t \mod n,$$

for i=1, . . . , N. Note that we omit the mod n notation from now on, and it is assumed that all arithmetic operations over integers are done modulo n.
2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form (i, $a_i$), where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik}\cdot G,$$

for k=0, . . . , t.
5. Each participant i checks that each participant j has correctly calculated the polynomial point $f_j(i)$ by calculating $f_j(i)$·G and verifying that $$f_j(i)\cdot G \stackrel{?}{=} \sum_{k=0}^{t} i^k(a_{jk}\cdot G)$$

$$\forall j=1, \ldots, N.$$

If all participants find that this equation holds for each polynomial, then the group can collectively be sure that they have all created the same shared polynomial.

Reconstructing a Shared Secret

Assume a participant wants to reconstruct a shared secret a which is the zeroth order of a shared polynomial. Given (t+1) points on this polynomial of the form $$(1,a_1), \ldots, ((t+1),a_{t+1}),$$

then to find the shared secret a, one calculates $$\text{interpolate}(a_1, \ldots, a_{t+1}) = \left( \sum_{l=1}^{t+1} a_l \prod_{\substack{1 \le j \le (t+1), \\ j \ne l}} (-j)(l-j)^{-1} \right) = a,$$

which is derived from a general formula known as "Lagrange Interpolation".

Public Key Calculation

Given the N zeroth-order private polynomial coefficient public keys $a_{i0} \cdot G$ for $i=1, \ldots, N$ shared in step 4 of JVRSS, each participant calculates the shared public key P using $$P = a \cdot G = \sum_{j=1}^{N} a_{j0} \cdot G,$$

corresponding to the shared secret a.

Addition of Shared Secrets

To calculate the addition of two shared secrets that are shared amongst a group of N participants, where each secret polynomial has order t, without any entity knowing the individual secrets, the following steps are taken:
1. Generate the first shared secret a, where participant i's share is given by $a_i$=JVRSS(i) for $i=1, \ldots, N$ with a threshold of (t+1).
2. Generate the second shared secret b, where participant i's share is given by $b_i$=JVRSS(i), with a threshold of (t+1).
3. Each participant i calculates their own additive share $v_i = a_i + b_i \bmod n$.

4. All participants broadcast their additive share $v_i$ to all other participants.
5. Each participant interpolates over at least (t+1) of the shares $v_i$ to calculate $v = \text{interpolate}(v_1, \ldots, v_{t+1}) = a+b$.

This method for the addition of shared secrets is denoted by ADDSS(i) for participant i, which results in each participant i knowing $v=(a+b)$.

Product of Shared Secrets

To calculate the product of two shared secrets that are both shared amongst a group of N participants, where each secret polynomial has order t, the group takes the following steps:
1. Generate the first shared secret a, where participant i's share is given by $a_i$=JVRSS(i) for $i=1, \ldots, N$. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $\mu_i = a_i b_i$.

4. All participants broadcast their multiplicative share $\mu_i$ to all other participants.
5. Each participant interpolates over at least (2t+1) of the shares $\mu_i$ at 0 to calculate $\mu = \text{interpolate}(\mu_1, \ldots, \mu_{2t+1}) = ab$.

This method for calculating the product of two shared secrets is denoted herein by $\mu = ab = \text{PROSS}(i)$ for participant i.

Inverse of a Shared Secret

In order to calculate the inverse of a shared secret a, the following steps are taken:
1. All participants calculate the product of shared secrets PROSS(i), the result of which is $\mu = ab \bmod n$.
2. Each participant calculates the modular inverse of $\mu$ which results in $\mu^{-1} = (ab)^{-1} \bmod n$.

3. Each participant i calculates their own inverse secret share by calculating $a_i^{-1} = \mu^{-1} b_i$.

This method for calculating the inverse of shared secrets is denoted by $a_i^{-1} = \text{INVSS}(i)$ for participant i.

Shared Private Key Generation and Verification

To calculate a shared private key a between $N \ge 2t+1$ participants, t+1 of which are required to create a signature, the participants execute JVRSS with a threshold of t+1 and public key calculation as described above. The result is that every participant $i=1, \ldots, N$ has a private key share $a_i$ and the corresponding shared public key $P=(a \cdot G)$.

Ephemeral Key Shares Generation

To generate ephemeral key shares and the corresponding r, as is required in a signature, a group of size N with a shared private key a of threshold (t+1) execute the following steps:
1. Generate the inverse share of a shared secret $k_i^{-1}$=INVSS(i), where (t+1) shares are required to recreate it.
2. Each participant calculates $$(x, y) = \sum_{i=1}^{N} (k_{i0} \cdot G),$$

using the obfuscated coefficients shared in the verification of $k_i$, then they calculate $r = x \bmod n$.

3. Each participant i stores $(r, k_i^{-1})$.

Identifying Denial of Service Attacks

Embodiments of the present invention enable denial-of-service attacks in the context of threshold signatures to be identified. FIG. 1 illustrates an example system 100 for generating a threshold signature. A complete description of one example signature scheme is provided below under the heading "Threshold Optimal Signatures". Embodiments of the present invention will be described with reference to FIG. 1, but it will be appreciated that the embodiments apply equally to other signature schemes, e.g. the Gennaro schemes mentioned above.

In general, each participant 102 of a group has a respective share of a shared private key which is used to generate a respective share of a signature. Each participant also has respective shares of one or more further shared secrets. For instance, each participant 102 has a respective share of an ephemeral private key and a respective share of a blinding private key. A blinding private key is used to obfuscate a different private key. In some examples, each participant 102 may also have a respective share of a second blinding private key.

As part of a threshold signature scheme, each participant 102 is generally required to share data with and obtain data from the other participants in the group for further calculation. Embodiments of the present invention may be used to determine whether the obtained data has been calculated correctly, and therefore whether the obtained data can be used to calculate a signature share.

The shared data that is required as part of the calculation of a respective signature share will be referred to as a "target share". That is, each participant 102 that generates a signature share requires a target share from each other participant.

Embodiments of the present invention may be used to determine whether one or more participants have provided incorrect versions of several types of incorrect target shares, i.e. target shares that have not been calculated correctly and which will therefore result in an incorrect signature share and an invalid signature.

One type of target share is referred to as a multiplicative share. The multiplicative share is a product of two secret shares, i.e. a product of a respective share of one shared secret and a respective share of another shared secret. For instance, one of the shared secrets may be an ephemeral private key and the other may be a blinding key used to blind (obfuscate) the ephemeral private key.

Another type of target share is referred to as an intermediary share. The intermediary share is a sum of a secret share and a product of two secret shares, i.e. a sum of i) a respective share of one shared secret and ii) a product of respective shares of two different shared secrets. For instance, the three shared secrets may be an ephemeral private key, a private key and a blinding key. Note that the intermediary share may be calculated based on an inverse ephemeral private key share. Note also that the blinding key used to calculate the intermediary share may be a different blinding key compared to the one used to calculate the multiplicative share, although that is not essential.

Embodiments will be described from the viewpoint of a first participant 102a, but it will be appreciated that the same methods may be performed by any of the participants 102. The first participant 102a has a first share of a first shared secret and a first share of a second shared secret. The first participant 102a also has a public key corresponding to the first shared secret and a public key corresponding to the second shared secret. The first participant 102a may also have a first share of a third shared secret, and a public key corresponding to the third shared secret. Note that "first" is used merely as a distinguishing label and does not necessarily mean first in a sequence.

Each other participant also has respective shares of the first and second shared secrets, and optionally the third shared secret. Each other participant also has public keys corresponding to the shared secrets.

In some examples, some or all of the shared secrets may be calculated using JVRSS as described above. Other secret sharing schemes may be used instead. The public keys corresponding to the shared secrets may be calculated using the obfuscated coefficients shared during JVRSS, i.e. using the obfuscated coefficients shared during step 4 of the JVRSS method described in the preliminaries. Normally, the obfuscated coefficients $a_{jk} \cdot G$ are communicated during JVRSS to verify one's own share. Now, for the purposes of the present invention, each participant verifies the respective share of each other participant. Note that the steps of JVRSS are not modified. Rather, the verification of the other participants shares is in addition to JVRSS.

The first participant 102a generates a first target share. The first target share may be generated based on (i.e. is a function of) the first share of the first shared secret and the first share of the second shared secret. The target share may also be a function of the first share of the third shared secret. Each other participant generates a respective target share in the same way using their respective shares.

The first participant 102a generates a first target value. Note that the first target value is merely an integer value. The first target value is generated based on (i.e. is a function of) the first target share and a set of target shares generated by the other participants. The set of target shares is made up of a predetermined number of target shares. The predetermined number is based on the degree of the shared secrets, i.e. the degree of the shared secret polynomials. In other words, the first target value requires a predetermined minimum of respective target shares in order to be generated correctly. The first target value may be generated by interpolating over the first target share and the set of target shares.

Each participant 102 may have a respective index, e.g. 1, 2, 3, etc. The first participant 102a may generate the first target value using the first target share and respective target shares from participants with indices following the index of the first participant 102a. That is, if the first participant 102a has index 1, the first participant 102a may use target shares from participants with indices 2, 3, and so on, until the required number of target shares is reached.

Each other participant generates a respective target value based on their respective target share and the predetermined number of target shares. Depending on the size of the group, one or more participants may generate their respective target value based on a different set of target shares.

The first participant 102a may obtain the other target shares directly from the respective participants. Or, the other participants may broadcast their shares. Or, one or more participants may collect the target shares and forward them to the first participant 102a. Similarly, the first participant 102a may broadcast the first target share to the other participants, or transmit the first target share directly to individual ones of the participants. In general, any communication between the participants may be via a secure communication channel.

The first participant 102a generates a target public key. The target public key is generated based on (i.e. is a function of) the first target value and a generator point. Each other participant also generates a target public key based on their respective target value and the generator point.

The first participant 102a generates a first verification share. The first verification share may be generated based on (i.e. a function of) the first share of the first shared secret and the public key corresponding to the second shared secret. Each other participant generates a respective verification share in the same way using their respective share.

The first participant 102a generates a verification public key. The verification public key is generated based on (i.e. is a function of) the first verification share and a set of verification shares generated by respective participants. The set of verification shares is made up of a predetermined number of verification shares. The predetermined number is based on the degree of the shared secrets, i.e. the degree of the shared secret polynomials. In other words, the verification key requires a predetermined minimum of respective verification shares in order to be generated correctly. The verification key may be generated by interpolating over the first verification share and the set of verification shares. In some examples, the interpolation may be elliptic curve interpolation, i.e. the sum is elliptic curve point addition.

The first participant 102a may generate the verification public key using the first verification share and respective verification shares from participants with indices following the index of the first participant 102a, similar to how the target value may be generated.

Each other participant generates a respective verification key based on their respective verification share and the predetermined number of verification shares. Depending on the size of the group, one or more participants may generate their respective verification key based on a different set of verification shares.

The first participant 102a may obtain the other verification shares directly from the respective participants. Or, the other participants may broadcast their shares. Or, one or more participants may collect the verification shares and forward them to the first participant 102a. Similarly, the first participant 102a may broadcast the first verification share to the other participants, or transmit the first verification share directly to individual ones of the participants.

The first participant 102a then compares the target public key and the verification public key. If the two public keys are not the same, then the first participant 102a can be sure that at least one of the target shares has been calculated incorrectly. In some instances, the first participant 102a obtains confirmation from all other participants that the target public key and verification public key that those participants have calculated are the same. In that case the first participant 102a can be confident that the target shares have been calculated correctly.

Therefore the target value can be used to calculate a first signature, which is then sent to a coordinator 101. If, on the other hand, the target public key is not the same as the verification public key, the first participant 102a knows that at least one of the target shares has been incorrectly calculated. The first participant 102a will then not use the target value in further calculations and thus prevent an invalid signature from being calculated.

Similarly, the other participants also perform the same comparison.

The group may have a size of N≥2t+1. The threshold of the shared secrets and of the threshold signature may be t+1, where t is the degree of the shared secret polynomial. In this example, the first predetermined amount (i.e. the number of other target shares required to generate the first target value) is 2t and the second predetermined amount (i.e. the number of other verification shares required to generate the verification public key) is t.

If the group has a size of N>2t+1 the first participant 102a may identity those participants that have provided an incorrect target share. To do so, the first participant 102a generates a plurality of verification public keys. Each of the plurality of verification public keys is generated used the first verification share and a different set of verification shares from other participants (still with the required number of verification shares). The first participant 102a then compares the plurality of verification public keys. Any verification public key that does not match the majority of the verification public keys has been calculated using a verification share provided by a dishonest (i.e. malicious) participant. Therefore the first participant 102a can deduce which of the participants is dishonest and therefore will have provided an incorrect target share.

As mentioned above, the first shared secret may be a first blinding key and the second shared secret may be an ephemeral private key. The target value may be a multiplicative key, e.g. a product of the first blinding key and the ephemeral private key (or inverse thereof).

In other examples, the first shared secret may be an ephemeral private key (or inverse thereof), the second shared secret may be a shared private key and the third shared secret may be a second blinding key. The target value may be an intermediary key.

It is also possible to identify if a participant 102 has provided a correct signature share, as opposed to a target share or target value that is then used to calculate a signature share. In other words, a participant 102 can calculate a signature share and provide data that can be used by a coordinator to verify whether the signature share has been calculated correctly. Similar to the examples given above, this method will be described from the perspective of the first participant 102a, but it will be appreciated that any participant may perform the same method.

The first participant 102a has a respective share of each of a shared private key, a shared ephemeral key, a first shared blinding key and a second shared blinding key. The shares of the shared keys may be calculated using JVRSS, as described elsewhere herein. Alternative secret sharing schemes may be used instead.

The signature share may be based on a respective share of the shared ephemeral key (or an inverse thereof), a message, a respective share of the shared blinding key, the shared private key and a public key corresponding to the shared ephemeral private key. Note that although the signature share may be based on a whole key (as opposed to a share of the key), that does not necessarily mean that a participant has access to the whole key, e.g. the shared private key.

In general, the signature share may be calculated as sum of at least two terms. Each term is calculated based on data that may be publicly known (or at least known to the other participants and/or coordinator), e.g. the message. Each term is also calculated based on data that should remain private to a given participant, e.g. a respective share of a shared key.

The first participant 102a provides, to the coordinator 101, a public key for each term of the signature share. The public key corresponds to the data of each term that is not publicly known. Note that the information that is shared to calculate these public keys may be shared during JVRSS. That is, the information need not be shared again separately by each participant, although that is not excluded.

The first participant 102a calculates a first public key corresponding to a first inverse ephemeral private key share. I.e. a public key corresponding to the inverse of a first share of the ephemeral private key. The first public key is calculated based on (i.e. is a function of) the inverse of the ephemeral private key obfuscated with the first blinding key, or in other words, the inverse of the ephemeral private key multiplied by the first blinding key. The first public key is also based on a public key corresponding to a first share of the first blinding key. The first participant 102a sends the first public key to the coordinator 101.

The inverse of the ephemeral private key multiplied by the first blinding key may be calculated based on a respective multiplicative share provided by each participant. Multiplicative shares have been discussed above. In summary, each participant may calculate a multiplicative share based on a first ephemeral private key share and a first blinding key share, e.g. the first participant 102a calculate a first multiplicative share. The first participant 102a may then calculate a multiplicative key based on the first multiplicative share and a respective multiplicative share from the other participants. The first participant 102a may then calculate the inverse of the multiplicative key. The first public key is then based on a public key corresponding to the inverse of the multiplicative key.

The first participant 102a also calculates a second public key. The second public key corresponds to a pre-signature share. The second public key is based on (i.e. is a function of) a third public key and a fourth public key. The third public key is a public key corresponding to an intermediary value. The intermediary value is calculated based on an inverse of the ephemeral private key, the shared private key and the second blinding key. The fourth public key is a public key corresponding to a first share of the second blinding key. The first participant 102a sends the second public key to the coordinator 101.

One way of calculating the intermediary value has been discussed above. In summary, the intermediary value may be calculated based on a first intermediary share calculated by the first participant 102a and respective intermediary shares calculated by the other participants. The first participant 102a may calculate a first intermediary share may be calculated based on an inverse of a first ephemeral private key share, a first private key share and a first share of the second blinding key.

The coordinator may already have access to the signature share calculated by the first participant 102a. Alternatively, the first participant 102a may provide the first and second public keys to the coordinator at the same time as, or before, providing the first signature share.

The first signature share is calculated based on a first share of the ephemeral private key, a message, a public key corresponding to the shared ephemeral private key, and a first share of the second blinding key. The coordinator 101 has access to the message and the public key corresponding to the shared ephemeral private key. The coordinator 101 may then use the first public key and the second public key obtained from the participant, along with the message and the public key corresponding to the shared ephemeral private key to calculate a public key corresponding to a candidate first signature share. I.e. an obfuscated candidate first signature share (candidate in the sense that at this point the coordinator 101 does not know if the public key corresponds to the same first signature share). The coordinator 101 also calculates a public key corresponding to the first signature share, i.e. the signature share provided by the first participant 102a. If the public key corresponding to the candidate first signature share matches the public key corresponding to the first signature share, the coordinator can be sure that the first participant 102a has calculated a correct signature share. The coordinator 101 may then use the first signature share to calculate a signature based on the first signature and one or more additional signature shares from respective participants. If the public key corresponding to the candidate first signature share does not match the public key corresponding to the first signature share, the coordinator 101 knows that the first participant 102a has not calculated a correct signature share and therefore may be attempting a denial-of-service attack.

In some examples, the coordinator may perform this verification check before generating the signature. That is, before the coordinator generates a complete signature based on the participants' signature shares, the coordinator may verify that each participant has correctly calculated their respective signature shares. In other examples, the coordinator may perform this verification check after generating the signature. That is, after the coordinator has generated a complete signature, the coordinator may verify that the signature is a valid signature. If the signature is invalid, the coordinator can use the verification check to identify which participant(s) has/have provided an incorrect signature share.

Note that in some examples, rather than the first participant 102a calculating the first and second public keys and sending them to the coordinator, the coordinator can instead calculate the first and second public keys. This prevents the first participant 102a from sending incorrect values of the first and second public keys. The coordinator 101 may then calculate the public key corresponding to the candidate signature share using the calculated first and second public keys. In this example the coordinator 101 is one of the participants and uses the information shared during the generation of respective signature shares by the respective participants to calculate the first and second public keys. For instance, the coordinator may use the obfuscated coefficients shared during step 4 of JVRSS to calculate:

$$(\alpha_i \cdot G) = \sum_{j=1}^{N} \sum_{k=0}^{t} i^k (\alpha_{jk} \cdot G),$$

$$(\beta_i \cdot G) = \sum_{j=1}^{N} \sum_{k=0}^{t} i^k (\beta_{jk} \cdot G),$$

$(\alpha_i \cdot G)$ and $(\beta_i \cdot G)$ may then be used to calculate the first and second public keys respectively. See section "catching incorrect signature shares" for further details.

Further illustrative examples of some embodiments of the invention are now provided.

In both the optimal and non-optimal threshold signature schemes mentioned above (and described in more detail below) there are two intermediary calculations before the calculation of the signature shares. Currently there are no steps taken to ensure the participants are sharing the correct values, and therefore an adversary may contribute incorrect values that may prevent a correct signature being calculated. The following describes methods to prove that the calculations with shares are done correctly.

Each participant who will verify the calculations needs to calculate the obfuscated shares corresponding to other participants secret shares for each shared secret. That is, all participants calculate some or all of:

$$(a_i \cdot G) = \sum_{j=1}^{N} \sum_{k=0}^{t} i^k (a_{jk} \cdot G),$$

$$(k_i \cdot G) = \sum_{j=1}^{N} \sum_{k=0}^{t} i^k (k_{jk} \cdot G),$$

$$(\alpha_i \cdot G) = \sum_{j=1}^{N} \sum_{k=0}^{t} i^k (\alpha_{jk} \cdot G),$$

$$(\beta_i \cdot G) = \sum_{j=1}^{N} \sum_{k=0}^{t} i^k (\beta_{jk} \cdot G),$$

for each participant i, using the obfuscated coefficients shared in JVRSS. These will be used in some of the verification steps of calculations with shares.

Catching Incorrect Multiplicative Shares

It is possible to verify the multiplication of shared secrets is correct. If this is not verified, then the calculation of the inverse ephemeral key may turn out to be incorrect. First note that at this point, each participant i has two shares $a_i$ and $b_i$ and knowledge of the corresponding public keys aG, bG. In order to verify that the multiplication of two shared secrets is correct, the participants take the following steps:

1. Each participant calculates their multiplicative share $\mu_i = a_i b_i$ and a verification share $a_i bG$. The second is the multiplication of $a_i$ with the public key $bG$ corresponding to the shared secret $b$.
2. Each participant i broadcasts these values.
3. Participant i calculates $\mu = \text{interpolate}(\mu_i, \ldots, \mu_{i'})$ where i' is i+2t. That is, each participant calculates the result $\mu$ with their own and the next 2t shares only. If they reach the end of the list of participants in the group and do not have 2t+1 shares yet, they return to the first share in the list and continue from there.
4. Each participant uses this result $\mu$ to calculate $\mu G$.
5. Each participant also calculates $abG = \text{ECinterpolate}(a_i bG, \ldots, a_{i'} bG)$ where in this case i' is i+t. That is, each participant uses their own and the next t shares to calculate the result. Note that ECinterpolate is the same as interpolate except the sum is elliptic curve point addition instead of usual arithmetic addition.
6. Finally, each participant compares $abG$ and $\mu G$. If they are the same, they know that $\mu$ is equivalent to $ab$ and this can be used in calculations.

We now show why it is impossible to successfully cheat if the scheme uses this verification method.

If participant k wants to cheat, they will send a share that is not the multiplication of their shares $a_k b_k$. If they send an incorrect share, participant k would send a share that we write as $a_k b_k + \delta_k$ without loss of generality. If one were to interpolate over the shares $a_i b_i$ including this incorrect share, the following would be calculated $$ab + \delta_1 = \text{interpolate}(a_i b_i, \ldots) = \left( \sum_{i=1}^{2t+1} a_i b_i \prod_{\substack{1 \le j \le 2t+1 \\ j \ne i}} \frac{-j}{i-j} \right) + \delta_k \prod_{\substack{1 \le j \le 2t+1 \\ j \ne k}} \frac{-j}{i-j}$$

As above, we can write the incorrect result as $(ab + \delta_1)G$ without loss of generality. We see from the equation above that $$\delta_1 = \delta_k \prod_{\substack{1 \le j \le 2t+1 \\ j \ne k}} \frac{-j}{k-j}$$

On the other hand, an adversary may send $a_k bG + \delta_k' G$ in place of the correct value $a_k bG$. Similarly, we find that after EC interpolation over the $a_i bG$ values, we find the result $$\delta_2 = \delta_k' \prod_{\substack{1 \le j \le t+1 \\ j \ne k}} \frac{-j}{k-j}.$$

Now an adversary may be able to find values for $\delta_k$ and $\delta_k'$ that satisfy these equations and $\delta_1 = \delta_2$. However, consider the next participant i=2. In their calculation, the adversary would need to add values $\delta_k$ and $\delta_k'$ that result in $$\delta_1 = \delta_k \prod_{\substack{2 \le j \le 2t+2 \\ j \ne k}} \frac{-j}{k-j}$$

and $$\delta_2 = \delta_k' \prod_{\substack{2 \le j \le 2t+2 \\ j \ne k}} \frac{-j}{k-j}.$$

There is no longer a single solution for either $\delta_1$ or $\delta_2$. Since all participants broadcast their shares, an adversary cannot send two different incorrect shares. They will be caught. It may be possible to identify who the adversaries are when the group size is larger than 2t+1. If we assume the worst-case scenario with the number of adversaries being t, there will be at least two subsets $a_i bG$ that generate the correct value of $abG$. By finding the two sets that generate the same value, this identifies a set of honest participants. Any other subsets of $a_i bG$ that generate that same value are sets of honest participants. The adversaries are the remaining parties that do not form part of a set that results in the correct value of $abG$.

In other words, step 3 of the above method is performed using 2t+1 shares. If the group size is 2t+1 then there is only one value to calculate $abG$. But if the group size is greater than 2t+1, each participant will have more than one value to calculate $abG$. Therefore the participants can compare the values and see which are the same. The subtlety that reveals any incorrect shares is due to the interpolation in step 5. This step is only over t+1 shares, so this will reveal if any incorrect shares are present—there will be 2t+1 different sets that are being interpolated over. And as motivated above, one only needs to interpolate two different sets to show if an incorrect share is present.

Note that if the group size is 2t+1 and the number of adversaries is t, it is not possible to definitively determine the adversaries. This is because the correct value will only appear out of one subset of values, but this subset cannot be determined.

In the threshold signature schemes, this verification may be used for the multiplication of the blinding key share and ephemeral key share with $a_i = \alpha_i$ and $b_i = k_i$.

Catching Incorrect Intermediary Shares

In the case of the threshold-optimal scheme, there is another value that is calculated with shares before the signature. This is called the intermediary share $\lambda_i = k_i^{-1} a_i + \beta_i$. At this point, each participant i has three shares $a_i$, $b_i$, and $c_i$ and knowledge of the corresponding public keys $aG$, $bG$, $cG$. The following steps are taken:

1. Each participant calculates their intermediary share $\lambda_i = a_i b_i + c_i$ and a verification share $a_i bG$. The second is the multiplication of $a_i$ with the public key $bG$ corresponding to the shared secret $b$.
2. Each participant i broadcasts these values.
3. Participant i calculates $\lambda = \text{interpolate}(\lambda_i, \ldots, \lambda_{i'})$ where i' is i+2t. That is, each participant calculates the result $\lambda$ with their own and the next 2t shares only. If they reach the end of the list of participants in the group and do not have 2t+1 shares yet, they return to the first share in the list and continue from there.
4. Each participant uses this result $\lambda$ to calculate $\lambda G$.
5. Each participant also calculates $(ab+c)G = \text{ECinterpolate}(a_i bG, \ldots, a_{i'} bG) + cG$ where is i+t where in this case i' is i+t. That is, each participant uses their own and the next t shares to calculate the result. Note that ECinterpolate is the same as interpolate except the sum is elliptic curve point addition instead of usual arithmetic addition.

6. Finally, each participant compares $(ab+c)G$ and $\lambda G$. If they are the same, they know that $\lambda$ is equivalent to $ab+c$ and this can be used in calculations.

The argument for why adversaries will not succeed is the same as the previous section.

Catching Incorrect Signature Shares

It is possible to find an incorrect signature share if the signature fails the verification, with the information obtained in JVRSS. This can be done for both the non-optimal scheme and for the optimal scheme.

For the non-optimal threshold signature scheme, the following is done. Given participant i's non-optimal signature share $(r, s_i)$ where $s_i = k_i^{-1}(e + a_i r)$, one can verify is this is the correct signature using normal ECDSA signature verification, using the obfuscated value $a_i \cdot G$ as the public key, and the hash of the message e. If the verification does not hold, the coordinator knows that this is an incorrect share from participant i.

In the optimal threshold scheme as described below, the standard ECDSA verification cannot be done as the signature has the form $(r, s_i)$ with $$s_i = k_i^{-1} e + r(k^{-1}a + \beta - \beta_i).$$

Standard signature verification verifies the ephemeral key that is common across the whole expression, but this cannot be done in this case. Instead, verifying participants must first calculate:

$$k_i^{-1} \cdot G = (k\alpha)^{-1}(\alpha_i \cdot G),$$

$$\sigma_i \cdot G = (k^{-1}a + \beta) \cdot G - (\beta_i \cdot G).$$

The coordinator 101 then stores $(k_i^{-1} \cdot G, \sigma_i \cdot G)$ for participant i. When they receive participant i's threshold optimal share $(r, s_i = k_i^{-1} e + r(k^{-1}a + \beta - \beta_i))$, they verify it by checking if $$s_i \cdot G \stackrel{?}{=} e(k_i^{-1} \cdot G) + r(\sigma_i \cdot G).$$

If this check holds, then the coordinator 101 can be sure that participant i sent the correct share. With these additional verifications above, any adversaries that attempt a denial-of-service attack by sending incorrect shares will be caught Threshold Optimal Signatures The following provides a description of a threshold optimal ECDSA scheme first detailed in GB2005953.1. Embodiments of the present invention may be used to identity denial-of-service attacks when calculating a signature share according to this scheme.

Figure 3:
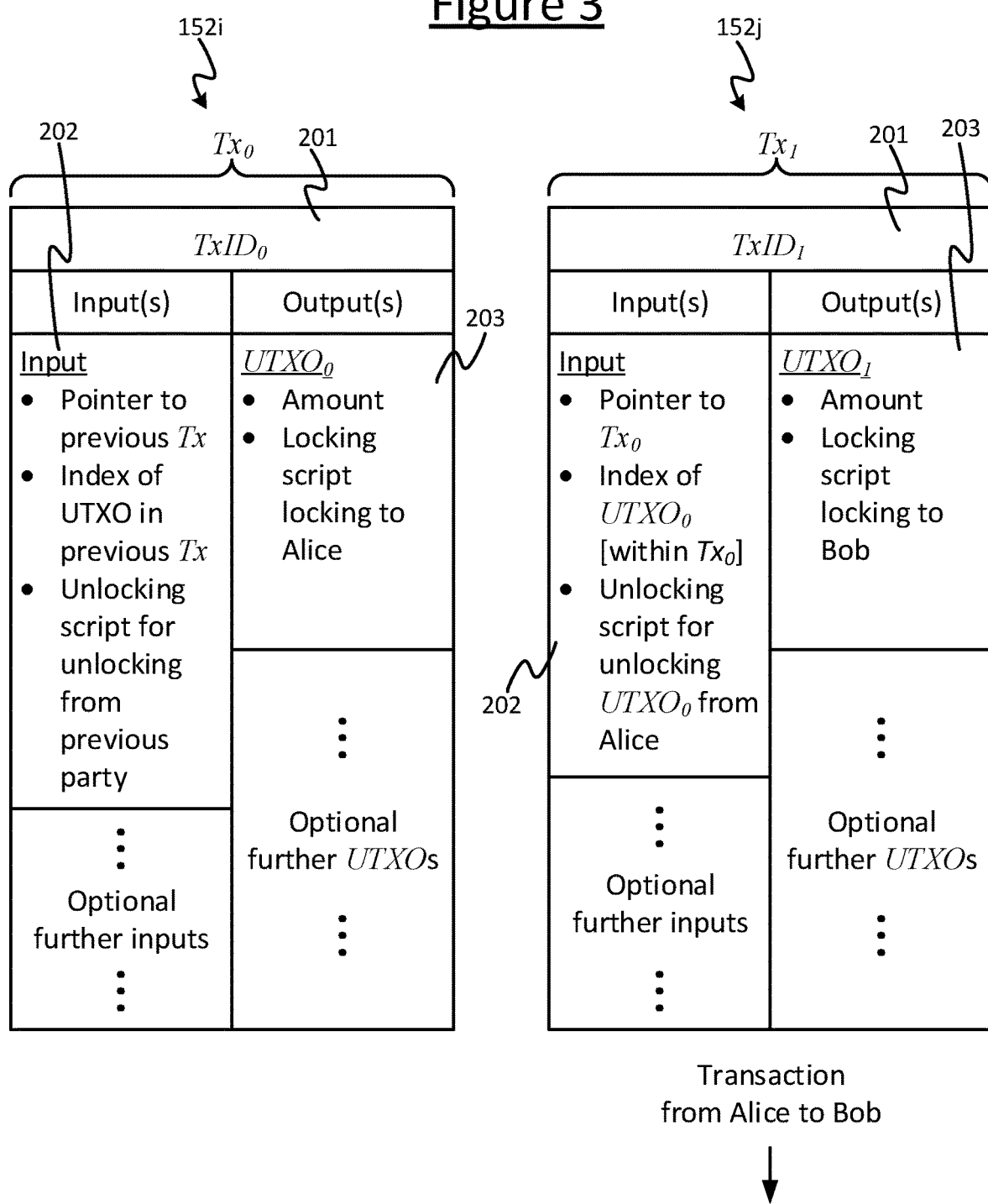

FIG. 1 illustrates an example system 100 for implementing a threshold optimal signature scheme, e.g. a threshold optimal ECDSA scheme. As shown, the system 100 comprises a plurality of parties, including a coordinator 101 and a group of participants 102. Only three participants 102 are shown in FIG. 3, but it will be appreciated that in general the system may comprise any number of participants. Furthermore, in FIG. 1 the coordinator 101 is shown as being distinct from the participants 102, but in some embodiments the coordinator 101 may also be one of the participants 102, e.g. the first participant 102a. Each of the coordinator 101 and participants 102 operates respective computing equipment.

Each of the respective computing equipment of the respective parties (i.e. coordinator 101 and participants 102) of the system 100 comprises respective processing apparatus comprising one or more processors, e.g. one or more central processing units (CPUs), accelerator processors (GPUs), application specific processors and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

The coordinator 101 is the party that initiates the signature using a threshold number of signature shares generated by respective participants of a group of participants 102. That is, the coordinator 101 generates the signature on a message to be signed. Again, note that generating a signature on a message is taken to mean that a signature is dependent on the message to be signed, or put another way, the signature is a function of the message to be signed. The coordinator 101 may also be the party that sends the signature, and optionally the message, to a third party 103 or otherwise outputs the signature. For instance, the third party 103 may be a certificate authority or other form of authority, or another user. In other examples, the signature may be recorded, e.g. in a database or other document. In some examples, the signature may be made available to the public, e.g. recorded on a website or other publicly accessible medium.

The coordinator 101 may transmit a message to be signed to the participants 102. The message may be transmitted to all of the participants 102, or to a subset of the participants, e.g. the threshold number of participants. In the example of FIG. 1, the group of participants comprises three participants 102a, 102b, 102c. The coordinator 101 may transmit the message to one participant who then forwards the message to one, some or all of the other participants.

The message may be transmitted over the internet using a LAN or WAN connection, or via alternative wired or wireless communication means. The message may be transmitted to each participant 102 individually, e.g. via a secure communication channel between the coordinator 101 and each participant 102, or broadcast to the group as a whole, e.g. via email or other means. The message may be transmitted in raw form, or in encrypted form. For instance, the message may be hashed one or more times.

One or more of the participants 102 may obtain the message via alternative means, i.e. not from the coordinator 101. For example, the message may be generated by one of the participants 102, or otherwise available, e.g. publicly. One or more participants 102 may receive the message from a third party 103. A participant 102 that obtains the message may transmit the message (in raw or encrypted form) to one or more other participants 102. For instance, the first participant 102 may transmit the message to the second participant 102b and/or the third participant 102c.

The coordinator 101 obtains (e.g. receives) a threshold number of signature shares. In the example of FIG. 1, the threshold is two and only the first participant 102a and the second participant 102b decide to generate a respective signature share. For instance, one or more of the participants 102 that generate a signature share may transmit their respective share directly to the coordinator 101, e.g. via a secure communication channel. Alternatively, one or more of the participants 102 may broadcast their respective shares, and/or make their share publicly available. As set out above, the coordinator 101 may also be a participant. In those embodiments, the coordinator 101 may also generate a respective signature share. In that sense, obtaining at least one of the threshold number of signature shares means generating at least one signature share, and therefore the coordinator 101 only need receive one less than the threshold number of signature shares.

In order to obtain the signature shares, the coordinator 101 may transmit a request for signature shares on a message. For instance, the coordinator 101 may transmit a request for signature shares to one, some or all of the group of participants 102.

Having obtained at least the threshold number of signature shares, the coordinator 101 generates the signature using the obtained shares. The coordinator 101 may then broadcast or transmit the signature to one or more other entities. Additionally or alternatively, the coordinator may store the signature, and/or record the signature as part of a digital record, e.g. in an email or other document.

The method for generating a signature share $s_i$ will now be described. The method is described from the perspective of the first participant 102a, but it will be appreciated that each other participant 102 that generates a signature share does so using an equivalent method, albeit using certain data specific to that other participant 102.

Each participant 102 has access to the following data items: a respective private key share $a_i$ (i.e. a share of the same private key), a respective ephemeral private key share $k_i$, and a common shared value r that is generated based on a common ephemeral public key k·G. The common ephemeral public key corresponds to, i.e. is generated based on, the ephemeral private key. Here, a value or key may be common in the sense that each participant has access to that same value or key. Note that unless specified, generating a second key based on a first key does not necessarily imply that the first key itself is known. Examples of how these data items may be generated are provided below.

The first participant 102a obtains, or already has access to, a message to be signed. The message may be in its raw form (e.g. plaintext), or in an encrypted or otherwise encoded for (e.g. ciphertext). The first participant 102a may obtain the message (in either form) from the coordinator and/or from another participant 102. Alternatively, the first participant 102a may generate the message to be signed.

The first participant 102a generates a first signature share $s_1$. Note that "first" in this context is just used as an arbitrary label to distinguish the particular participant and the particular signature share from other participants and signature shares respectively, and does not necessarily imply that the first participant 102a is the first participant to generate a signature share $s_i$, or that the first signature share $s_1$ is the first in an ordered list of signature shares $s_i$.

In some embodiments, the first signature share $s_1$ may be generated based on, i.e. is a function of, a first message-independent component (MIC) and a first message-dependent component (MDC), where again "first" is just used as a label. The MIC is generated independently of the message. That is to say, the MIC is not a function of the message to be signed (i.e. the MIC is not generated based on the message), and knowledge of the message is not required to generate the MIC. In contrast, the MDC is a function of the message to be signed and knowledge of the message is required to generate the MDC.

In other embodiments, the first signature may not be a function of the first message-independent components (MIC). In these embodiments, the first message-independent component is generated and made available to the coordinator 101, e.g. transmitted to the coordinator 101 or broadcast to one or more participants 102. The first message independent component (MIC) may be shared with the coordinator in advance of, and separately from the first signature share.

The coordinator 101 may obtain a respective message-independent component (MIC) from at least the threshold number of participants, and generate the signature based on the respective signature shares (which are a function of the respective message-dependent components (MDC)) and the respective message-independent components (MIC). More details are provided below.

Since the MIC does not require knowledge of the message, the MIC can be pre-calculated. In other words, the MIC can be generated before obtaining the message. Therefore a plurality of different MICs can be pre-calculated, each for use in generating a different respective signature shares $s_1{}'$ for signing different messages, where the prime (') indicates that it is a different instance of the first signature share.

Having generated the first signature share $s_1$, the first participant 102a makes the first signature share $s_1$ available to the coordinator 101 for generating the signature s on the message. If the first participant 102a is the coordinator 101, making the first signature share $s_1$ available to the coordinator 101 may merely mean outputting the first signature share $s_1$ to a function for generating the signature s. Otherwise, the first participant 102a may transmit the first signature share $s_1$ to the coordinator 101, or to one or more other participants 102 for forwarding to the coordinator 101, or broadcast the first signature share $s_1$, or use a combination of these options.

As stated above, the first signature share $s_1$ may be generated based on a first MIC and a first MDC. Regardless of whether the first signature share is a function of the first MIC, the first MIC is generated based on (i.e. is a function of) the first private key share $a_1$ (i.e. the share of the private key a known to the first participant 102a). The first MIC may also be based on the first ephemeral private key share $k_1$ (i.e. the share of the ephemeral private key k known to the first participant 102a) and the shared value r generated based on the ephemeral public key k·G corresponding to the ephemeral private key k. The first MDC is generated based on (i.e. is a function of) the message (in raw or encrypted form) and may also be generated based on the first ephemeral private key share $k_1$. Variations of the MIC and MDC are provided below.

Preferably, the first private key share $a_1$ may be calculated using a joint secret sharing scheme, e.g. using the JVRSS technique described above. For instance, the first participant 102a may have an index of 1, and generate the first private key share using $a_1$=JVRSS(1) for participant 1, where the private key is denoted by a. Each participant may generate a respective private key share $a_i$. For instance, the second participant 102b may generate a second private key share using $a_2$=JVRSS(2) for participant 2, and so on.

Generating a first private key share $a_1$ using a joint secret share scheme may comprise generating a set of numbers $a_{ij} \in_R \mathbb{Z}_n \backslash \{0\}$, $\forall j=0, \ldots, t$, and then generating a first polynomial $f_1(x) = a_{10} + a_{11}x + \ldots + a_{1t}x^t \mod n$, where the set of numbers are the coefficients of the polynomial. Each of the other participants 102 generates a respective polynomial using a respective set of numbers. For instance, the second participant 102b generates a second polynomial $f_2(x)=a_{20}+a_{21}x+\ldots+a_{2t}x^t$ mod n. The participants 102 then transmit, to each other participant, a value of their respective function evaluated at the index of that other participant. For instance, the first participant 102a evaluates $f_1(2)$ for the second participant 102b and then transmits that value to the second participant 102b, evaluates $f_1(3)$ for the third participant 102c and then transmits that value to the third participant 102c, and so on. The first participant 102a obtains the respective values generated, as a function of the first participant's index, by the other participants 102. The values may be transmitted over the internet, or via other means. The values may be transmitted via respective secure communication channels between respective pairs of the participants. Instead of transmitting directly, one or more participants 102 (e.g. the first participant 102a) may broadcast their respective values. Having obtained at least the threshold number of values from at least the threshold number of participants, the first participant 102a generates the first private key share based on the first value and each other obtained data value, e.g. $f_2(1)$, $f_3(1)$, etc.

The first participant may calculate the corresponding public key a·G based on a set of obfuscated coefficients, where the coefficients are used to generate the respective private key shares $a_i$ of each participant 102. That is, when generating the ephemeral private key share $k_i$, each participant 102 may share the obfuscated coefficients $a_{ij}\cdot G$ with each other participant 102. The coefficients are obfuscated by a common generator point G on the chosen elliptic curve. These obfuscated coefficients may be transmitted between participants 102 directly, or broadcast to the group. For instance, the first participant 102a may broadcast the obfuscated coefficients $a_{10}\cdot G$, $a_{11}\cdot G$, $a_{12}\cdot G$, and so on. The public key corresponding to the private key may then be calculated as $$P = a\cdot G = \sum_{j=1}^{N}(a_{j0}\cdot G).$$

Note that the private key shares $a_i$ may be generated using an alternative method, i.e. not using the JVRSS method described above. Whilst each participant requires a share of a private key a in order to generate a respective signature share $s_i$, the particular method for generating the private key share may be chosen to suit the particular scenario, e.g. whether some, all or none of the participants can be trusted, or whether a trusted dearer is available to distribute key shares, etc. Methods for generating shares of a private key are, in themselves, known in the art. Similarly, method for distributing shares of a private key (or other such data) are, in themselves, known in the art. That being said, the private key share $a_i$ may be generated in a number of ways. For instance, a dealer (e.g. the coordinator) may be used to generate and distribute one, some or all of the private key shares $a_i$, e.g. using a Shamir's secret sharing scheme. One such scheme that may be used for generating and distributing private key shares $a_i$ is described in WO2017145010A1.

Similarly, an alternative to JVRSS may be used when generating some or all of the private key shares described below, e.g. the ephemeral private key share $k_i$, the first blinding value key share $a_i$ and/or the second blinding value key share $\beta_i$.

The first ephemeral private key share $k_1$ may be calculated using a joint secret sharing scheme, e.g. using the JVRSS technique described above. For instance, the first participant 102a may have an index of 1, and generate the first ephemeral private key share using $k_1=JVRSS(1)$ for participant 1, where the ephemeral private key is denoted by k. Each participant 102 may generate a respective ephemeral private key share $k_i$. For instance, the second participant 102b may generate a second ephemeral private key share using $k_2=JVRSS(2)$ for participant 2, and so on.

Generating the first ephemeral private key $k_1$ share using the joint secret sharing scheme comprises the same steps described above for generating the first private key share $a_1$, except that the random numbers used for generating the ephemeral private key share $k_1$ are different numbers comparted to those used for generating the private key share $a_1$.

Note that the same private key a, and private key shares $a_i$ are used for each signature, whereas the ephemeral private key k and ephemeral private key shares $k_i$ are changed for each signature.

The shared value r is generated based on the ephemeral public key k·G corresponding to the ephemeral private key k. The ephemeral public key (x, y) comprises two components, usually referred to as the x and y components. The shared value r may be a function of the x component of the ephemeral public key, e.g. r=x mod n.

The ephemeral public key k·G may be generated based a set of obfuscated coefficients, wherein the coefficients were used to generate the respective ephemeral private key shares $k_i$ of each participant 102. That is, when generating the ephemeral private key share $k_i$, each participant 102 shares the obfuscated coefficients $k_{ij}\cdot G$ with each other participant 102. The coefficients are obfuscated by a common generator point G on the chosen elliptic curve. These obfuscated coefficients may be transmitted between participants 102 directly, or broadcast to the group. For instance, the first participant 102a may broadcast the obfuscated coefficients $k_{10}\cdot G$, $k_{11}\cdot G$, $k_{12}\cdot G$, and so on. The ephemeral public key may then be calculated as $$(x, y) = \sum_{i=1}^{N}(k_{i0}\cdot G).$$

In some embodiments, the first MIC is generated based on a first inverse share $k_1^{-1}$ corresponding to the first ephemeral private key share k1. That is, the first inverse share $k_1^{-1}$ is a function of the first ephemeral private key share $k_1$.

The first inverse share $k_1^{-1}$ may be an inverse of shared secrets, for example, generated by calculating $k_1^{-1}=INVSS(1)$ for participant 1. As set out above, calculating the inverse of shared secrets comprises calculating the product of shared secrets. The first participant 102a generates an intermediate value μ as the product of the first ephemeral private key k and a first blinding key α. For instance, the intermediate value may be calculated as by μ=kα=PROSS(1) for participant 1, the result of which is μ=kα mod n.

This may involve each participant 102 generating a multiplicative share $\mu_i=k_i\alpha_i$, where $\alpha_i$ is a share of the first blinding key α. Each participant 102 may calculate their respective share $\alpha_i$ of the first blinding key α using a joint secret sharing scheme, e.g. using the JVRSS technique described above. For instance, the first participant 102a may have an index of 1, and generate a share of the first blinding key using $\alpha_1=JVRSS(1)$ for participant 1. Each participant shares (e.g. via direct transmission or broadcasting) their respective multiplicative share $\mu_i$, and then generate the intermediate value $\mu$ based on each of the multiplicative shares $\mu_i$, e.g. by interpolation. The first inverse share $k_1^{-1}$ may be generated by calculating the inverse of the intermediate value $\mu$. For instance, the first participant 102a may calculate the modular inverse of $\mu$ which results in $$\mu^{-1} = (k\alpha)^{-1} \bmod n.$$

The first participant 102a may then calculate the first inverse share $k_1^{-1}$ based on the modular inverse $\mu^{-1}$ of the intermediate value and their respective first blinding key share $\alpha_1$, e.g. by calculating $$k_1^{-1} = \mu^{-1}\alpha_1.$$

Note that the use of the blinding key share $\alpha_i$ is optional and may be omitted from the above steps.

Optionally, the MIC may be generated based on (i.e. a function of) a share of a second blinding key $\beta$. That is to say, the MIC is also based on the first share $\beta_1$ of the second blinding key $\beta$, in addition to the previously mentioned data items. The first share of the second blinding key may be calculated using a joint secret sharing scheme, e.g. using the JVRSS technique described above. For instance, the first participant 102a may have an index of 1, and generate the first share of the second blinding key using $\beta_1$=JVRSS(1) for participant 1, where the second blinding key is denoted by $\beta$.

The MIC may be generated based on a first pre-signature share $\sigma$1 which is a function of a first intermediary share $\lambda_1$ and a respective intermediary share $\lambda_i$ obtained from at least the threshold number of participants 102. That is, each of the participants 102 may generate a respective intermediary share $\lambda_i$ and transmit and/or broadcast those intermediary shares $\lambda_i$ to the other participants 102. The first participant 102a may collect the intermediary shares $\lambda_i$ to generate a common intermediary value $\lambda$, e.g. by interpolation of the intermediary shares $\lambda_i$. The first participant 102a, (and optionally, the other participants 102) may generate a plurality of pre-signature shares $\sigma_1'$, each for use in the generation of different signature shares $s_1'$.

The first intermediary share $\lambda_1$ may be a function of the first private key share $a_1$ and the first inverse share $k_1^{-1}$. In that case, each of at least the threshold number of participants 102 generates and shares a respective intermediary share $\lambda_i$ that is a function of their respective private key share $a_i$ and their respective inverse share $k_i^{-1}$.

Alternatively, the first intermediary share $\lambda_1$ may be a function of the first private key share $a_1$ and the first share of the first blinding key $\alpha_1$. In that case, each of at least the threshold number of participants 102 generates and shares a respective intermediary share $\lambda_i$ that is a function of their respective private key share $a_i$ and their respective share of the first blinding key $\alpha_1$.

In some embodiments, the first pre-signature share $\sigma_1$ may also be generated based on the first share of the second blinding key $\beta_1$. For instance, the first intermediary share $\lambda_1$ may be a function of the first share of the second blinding key $\beta_1$. In additional or alternative embodiments, the first intermediary share $\lambda_1$ may also be a function of the common value r.

Figure 2:
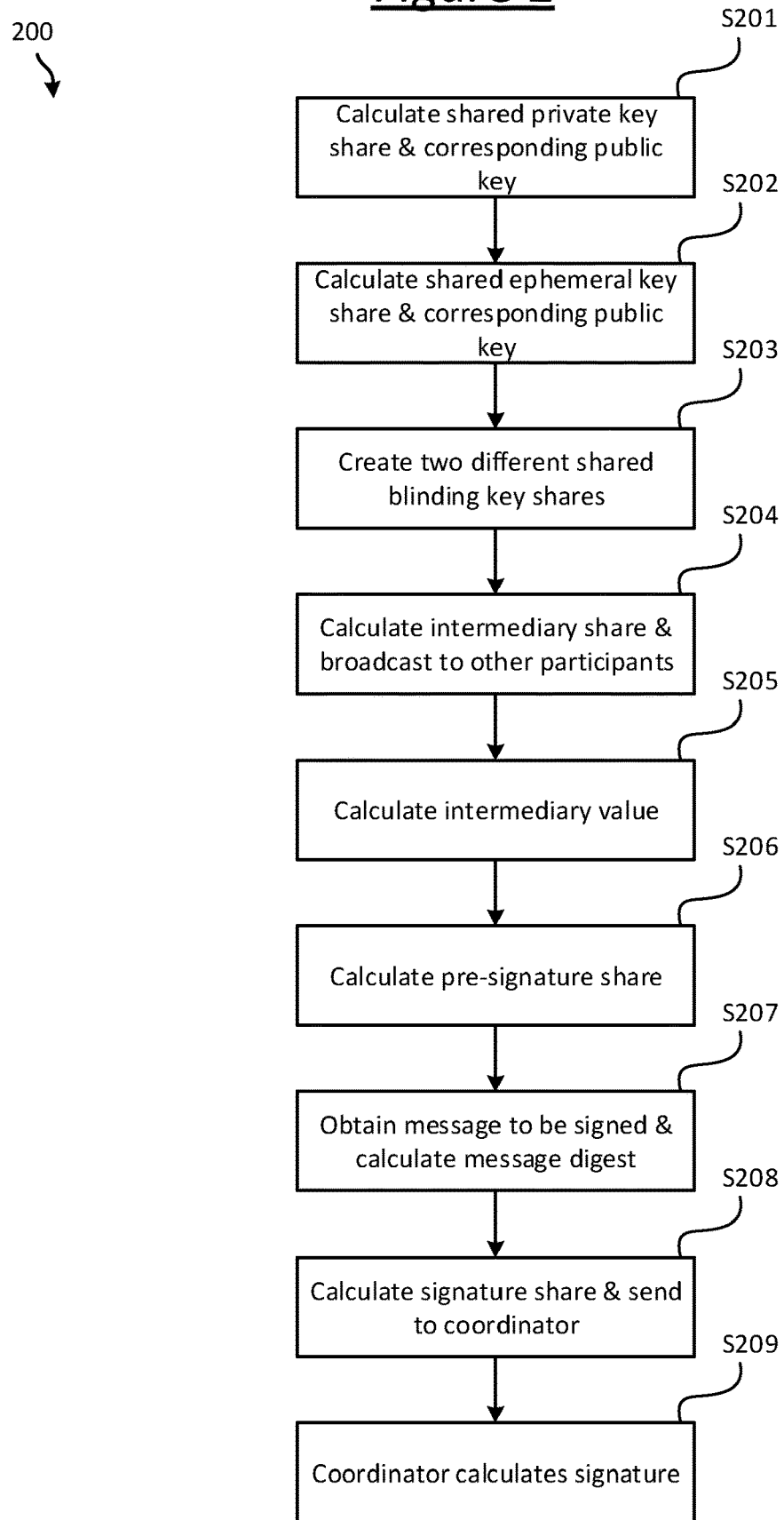

FIG. 2 illustrates an example method 200 for generating a signature on a message according to embodiments of the invention. Steps S201 to S208 are performed by each of a threshold number of participants 102 in this example (including the first participant 102a). Step S209 is performed by a coordinator 101, who may also may one of the participants performing steps S201 to S208. It will be appreciated that some of the steps may be omitted or be performed in a different order.

The example method 200 enables the creation of a shared secret of threshold (t+1) in a group of N≥2t+1 participants, where the signing threshold is also (t+1).

Set-Up:

In step S201, each participant 102 calculates a shared private key share and a corresponding public key. For instance, each participant 102 may calculate the shared private key, and corresponding public key using JVRSS and the calculation of the public key given in the preliminaries. At this point, each participant i has a secret key share and public key $(a_i, P)$, where P is notation for the public key corresponding to the shared private key. The shared private key has a threshold of (t+1).

Pre-Calculation:

In step S202, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share $(k_i^{-1}, r)$, with a threshold of (t+1).

In step S203, each participant 102 creates two different shared blinding key shares. For instance, each participant 102 may create two shared secrets so that participant i has shares $\alpha_i$=JVRSS(i) and $\beta_i$=JVRSS(i), each shared secret having a threshold (t+1). Note that in some examples, not all of the shared secrets need to have the same threshold.

In step S204, each participant 102 calculates an intermediary share and broadcasts their intermediary share to the other participants. For instance, each participant i may calculate the intermediary share $\lambda_i = k_i^{-1}a_i + \beta_i$. This value has a threshold of (2t+1).

In step S205, each participant 102 calculates an intermediary value based on at least the intermediary shares. For instance, each participant 102 may calculate the intermediary value using interpolation over (2t+1) shares $\lambda$=interpolate($\lambda_1, \ldots, \lambda_{2t+1}$)=$k^{-1}a+\beta$.

In step S206, each participant 102 calculates a pre-signature share. For instance, each participant i may calculate their pre-signature share $\sigma_i = \lambda - \beta_i = (k^{-1}a+\beta) - \beta_i$. Each participant 102 may store $(r, k_i^{-1}, \sigma_i)$, and the private key share and corresponding public key $(a_i, P)$.

Note that since a different ephemeral key is used for each signature, multiple ephemeral keys can be set up at one time, that is, steps S202 to S206 can be repeated to create multiple ephemeral keys during pre-calculation and stored for later use. These can be executed at the same time so that there are no additional rounds of communication. Note that preferably, a different value of $\alpha$ and $\beta$ should be used for each signature.

Signature Generation:

In order to sign a message msg, at least (t+1) participants must perform steps S207 and S208.

In step S207, at least the threshold number of participants 102 obtain a message to be signed and calculate a message digest. For instance, a coordinator 101 may send a request to (t+1) participants to create a signature share on the message msg. Each participant i may calculate the message digest e=hash(msg). In some examples, this hash function is the double SHA-256 hash function. Alternative hash functions may be used.

In step S208, at least the threshold number of participants 102 calculate a signature share and send it to the coordinator 101. For instance, each participant i may calculate their signature share $s_i=k_i^{-1}e+r\sigma_i$, and then send their signature share $(r, s_i)$ to the coordinator. Note that the value r may not be sent by all participants.

In step S209, the coordinator 101 calculates the signature. For instance, the coordinator 101 may calculate $s=\text{interpolate}(s_1, \ldots, s_{t+1})=k^{-1}(e+ar)$, and finally the signature $(r, s)$.

There are several alternatives for pre-calculating the message independent component of the signature share. These can broadly be split into two sets of variations: when to include r in the calculation, and when to include $(k\alpha)^{-1}$. These can be selected independent of each other and so there are eight variations to the above method 200.

One modification is to store $(r, k_i^{-1}, r\sigma_i)$ during step S206, meaning that r is included in the pre-signature share.

Another modification is that the multiplication with r can also come earlier during the calculation of the intermediary shares. By defining instead $\lambda_i=rk_i^{-1}a_i+\beta_i$ in step S204, then in step S206, $\sigma_i=\lambda-\beta_i=(rk^{-1}a+\beta)-\beta_i$ and the calculation of signature shares is $s_i=k_i^{-1}e+\sigma_i$.

Another modification is to instead calculate $\lambda_i=\alpha_ia_i+\beta_i$ such that $\lambda=(k\alpha)^{-1}(\alpha a+\beta)$, and $\sigma_i=\lambda-(k\alpha)^{-1}\beta_i$. The two variations of including r at alternative points can be done in combination with this. Each participant has knowledge of $k\alpha$ as it is calculated in step S202 of the pre-calculation. Additionally, all participants 102 broadcast their $\lambda_i$ share. So each participant 102 has knowledge of (at least) 2t+1 shares and the value $k\alpha$. They can then calculate $$\lambda=(k\alpha)^{-1}\times\text{interpolate}(\lambda_1, \ldots, \lambda_{2t+1})$$

Another modification is to instead calculate the intermediary value as $\lambda=(\alpha a+\beta)$ and the pre-signature share as $\sigma_i=\lambda-\beta_i$. Finally, the signature share would then be $s_i=k_i^{-1}e+r(k\alpha)^{-1}\sigma_i$. The two variations of when to include r in the calculation can also be done in combination with this. Each participant 102 has knowledge of $k\alpha$ from the calculation of $k_i^{-1}$. They can then calculate $(k\alpha)^{-1}$ mod n with this, and then include it in the calculation of $s_i$.

In summary, each participant 102 may generate four secret shares: $a_i, k_i, \alpha_i, \beta_i$. Two products need to be calculated in the example method 200: $k\alpha$ which is then used to calculate $(k\alpha)^{-1}\alpha_i=k_i^{-1}$ (interpolation over these shares gives $k^{-1}$ as the $\alpha$'s will cancel, and $k^{-1}a$ for use in the signature, which uses the first product, and so if the shares are expanded, the calculated gives $k_i^{-1}a_i=(k\alpha)^{-1}\alpha_ia_i$. Any calculations with the $k_i^{-1}$ share, which is made of $k\alpha$ and $\alpha_i$, can be done by doing the calculation just with $\alpha_i$ itself first, and then multiplying by $(k\alpha)^{-1}$ where necessary.

One version of the above scheme can be summarised by saying that a signature is calculated using shares that are composed of a message independent component (MIC) and a message dependent component (MDC), where the MIC may be based on the pre-signature share $\sigma_i$ and the MDC is based on the message e.

An equivalent scheme comprises calculating the MIC as above, and then incorporating this in the signature along with the signature shares, e.g. after interpolation of the signature shares which are made of just an MDC. Explicitly, the scheme may be same up to step S206 of the pre-calculation, where the intermediary shares include the r value, $\lambda_i=k_i^{-1}a_ir+\beta_i$ such that after interpolation this is $\lambda=k^{-1}ar+\beta$.

At this stage, the participants have knowledge of $(r, k_i^{-1}, \lambda, \beta_i)$ and store this along with the private key share and corresponding public key $(a_i, P)$, Then in order to generate their signature share on a given message m which is hashed to create the message digest $e=\text{hash}(m)$, the participants calculate $$s_i=k_i^{-1}e-\beta_i,$$

and send this to a coordinator. The coordinator then calculates $$s = \text{interpolate}(s_1, \ldots, s_{t+1})+\lambda, = k^{-1}e+k^{-1}ar,$$

resulting in the expected signature share since the $\beta$ terms cancel. Similar variations of this protocol can be made as above describing when the $(k\alpha)^{-1}$ and r is included in the calculation.

The following variations for calculating the message-independent component may be implemented:

i) Calculate:

$$\lambda=k^{-1}a+\beta$$

Then the signature shares are now:

$$s_i=k_i^{-1}e-r\beta_i$$

And the signature is generated as:

$$s=\text{int}(s_1, \ldots, s_{t+1})+r\lambda$$

ii) Calculate:

$$\lambda=\alpha ar+\beta$$

Then the signature shares are now:

$$s_i=\alpha_ie-\beta_i$$

And the signature is generated as:

$$s=(k\alpha)^{-1}(\text{int}(s_1, \ldots, s_{t+1})+\lambda)$$

iii) Calculate:

$$\lambda=\alpha a+\beta$$

Then the signature shares are now:

$$s_i=k_i^{-1}e-r\beta_i$$

And the signature is generated as:

$$s=(k\alpha)^{-1}(\text{int}(s_1, \ldots, s_{t+1})+r\lambda)$$

iv) Calculate:

$$\lambda=\alpha ar+\beta$$

Then the signature shares are now:

$$s_i=k_i^{-1}e-(k\alpha)^{-1}\beta_i$$

And the signature is generated as:

$$s=(\text{int}(s_1, \ldots, s_{t+1})+(k\alpha)^{-1}\lambda)$$

v) Calculate:

$$\lambda=\alpha a+\beta$$

Then the signature shares are now:

$$s_i=k_i^{-1}e-r(k\alpha)^{-1}\beta_i$$

And the signature is generated as:

$$s=(\text{int}(s_1, \ldots, s_{t+1})+r(k\alpha)^{-1}\lambda)$$

One difference between the method 200 and the previous schemes is that the calculation of the $k^{-1}a$ term in the signature may be moved into the pre-calculation phase. The result of this is that the signature generation has the same threshold as the private key calculation and so is now a threshold-optimal scheme. To see how the correct signature is found, it is noted that the interpolation over the signature shares results in $$s = k^{-1}e + r(k^{-1}a + \beta - \beta) = k^{-1}e + r(k^{-1}a) = k^{-1}(e + ar),$$

which is exactly the signature as required.

Note that the thresholds of the secrets may be different. That is the threshold of a, k, α, β themselves do not necessarily need to be the same to execute the signature generation scheme. For example, if there is a group of six and three are needed to create the signature and/or private key, they could technically do the calculation with the threshold of the k being four and the thresholds of the other shared secrets being three, and they will still have a threshold-optimal scheme.

Note that if the blinding secret β is not used, then it may be possible to calculate the ephemeral key and therefore the shared secret key in the following way. Assume that the participants use simply ($k^{-1}a$), and that they also know r, e, and s. Anyone in the scheme can calculate $$(s - (k^{-1}a)r)e^{-1} = k^{-1}.$$

This result can then be used to calculate $$(k^{-1})^{-1}(k^{-1}a) = a,$$

which is the shared private key.

By including β in the calculation, this calculation cannot be done. The value ($k^{-1}a + \beta$) gives away no information about the individual secrets, nor the result $k^{-1}a$. In order to gain any information that would reveal the private key a, at least (t+1) participants must collaborate which is the same number as the threshold of the private key, and so the security is not decreased by calculating this intermediate value λ.

A problem to solve with previous threshold optimal signature calculations is that one must calculate the product of two shared secrets, where the secrets are sums of individual secrets of all participants in a group $$a = \sum_{i=1}^{N} a_{i0},$$

$$k = \sum_{i=1}^{M} k_{i0},$$

In a signature, if the private key a is a shared secret then necessarily k must be as well (or else a can be calculated by anyone who knows k). The second term in the signature is then the multiplication of two shared secrets and this is the part that makes it difficult to achieve optimality. In the non-optimal scheme by Gennaro et al. and the example method 200 described above, these secrets are each the zeroth order of a polynomial of order-t, and multiplying the polynomials together results in a threshold of 2t+1 shares required to calculate the result of the multiplication. To ensure honesty in this scheme, most communications can be broadcast, and simple equivalences can be checked. Additionally, if a participant drops out of the calculation of a signature, it is easy for another participant to contribute.

In the threshold-optimal scheme by Gennaro et al., this threshold of 2t+1 is avoided by calculating the individual terms in the product of the secrets individually. That is, each pair of participants i, j calculate the individual terms $a_{i0}k_{j0}$ for each i, j and summing these results. The ephemeral key k is created during signing, and then these products of individual secret contributions are calculated using Pallier encryption. This requires that each participant must communicate individually with all other signers. To ensure honesty in this case, there are multiple zero-knowledge proofs that must be executed. In this case, if a participant drops out of the calculation of the signature, the signature algorithm must be restarted.

In other words, each secret is the sum of individual secrets and the multiplication of two secrets is a multiplication of two sums of individual terms, which can be expanded out as $$a_{10}b_{10} + a_{20}b_{10} + \ldots b_{n0}a_{n0}, \text{ etc}$$

The Gennaro scheme calculates these terms individually. That is, participant 1 has to calculate $a_{20}b_{10}$ with participant 2, and also $a_{30}b_{10}$ with participant 3 and so on. These are then all summed together. These individual calculations involve computationally expensive zero knowledge proofs. So as soon as there are many people in the scheme it becomes inefficient. This is also all done at the signing phase, and so it is a computationally expensive way to calculate a signature.

In a simple case with 3 participants, the rounds of communication are roughly comparable between the two schemes (i.e. the optimal threshold scheme by Gennaro et al. and the example method 200): while the Gennaro scheme does have more, this is not where the main efficiency savings are. The savings are in the volume of data that is calculated and communicated. Gennaro's scheme has to include multiple zero-knowledge proofs (ZKPs) which are not present in the example method 200.

The following compares a 2-of-3 scheme implemented using the optimal threshold scheme by Gennaro et al. and the example method 200. In Gennaro's scheme there is a JVRSS before signing and an additional encryption key to create for Pallier's encryption. Then there are seven ZKPs to create, and seven ZKPs to verify in the signature calculation. These ZKPs cannot be sent simultaneously, so there are multiple rounds of communication in the signing phase. Additionally, in some steps, each participant must communicate individually with all other participants in the signing phase, which is inefficient. This means that those participants must all be online at the same time. In contrast, the present invention enables a given participant to calculate a signature share without the other participants being online.

On the other hand, in the present scheme described above, there are four JVRSS calculations in the pre-signing phase and no ZKPs at any point. The JVRSS calculation can be done simultaneously and so the communication is the same as one JVRSS. In the signing phase, there is only a request-response style communication, and all information can be broadcast to the group.

To compare between the storage of the two schemes, note that the ephemeral key is calculated with the set-up stage in the scheme above. This means that there is more storage required when compared to Gennaro's scheme. For the scheme described above, there are three additional values to be stored corresponding to creating a signature, each with e.g. 32 bytes of storage space required. This is minimal considering the efficiency savings in the calculation and communication, and the optimality achievement.

To summarise, Gennaro's scheme reduces the storage required after set-up and pre-calculation but increases the calculation and communication during the signature calculation. This is due to it being inefficient to move any more of the calculation to pre-signing in Gennaro's scheme. The scheme of the present invention is more efficient than Gennaro's optimal scheme, particularly if the inequality $N \geq 2t+1$ is acceptable.

Example Use Case of Threshold Signatures

In general, the present invention can be used to generate a signature on any message. As a particular example use case, the message may be part or all of a blockchain transaction. That is, the signature may be used to sign one or more inputs and/or one or more outputs of a blockchain transaction.

FIG. 3 illustrates an example transaction protocol for use as part of a blockchain protocol. Example blockchain protocols are well documented in the literature, but a description of an example protocol transaction is provided here for completeness. This is an example of a UTXO-based protocol. A transaction 152 (abbreviated "Tx") is the fundamental data structure of the blockchain (each block of the blockchain comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital token, e.g. representing an amount of a digital asset. This represents a set number of tokens on the (distributed) ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners.

Say a first user, e.g. Alice, wishes to create a transaction 152j transferring an amount of the digital token in question to a second user, e.g. Bob. In FIG. 3 Alice's new transaction 152j is labelled "$Tx_1$". It takes an amount of the digital token that is locked to Alice in the output 203 of a preceding transaction 152i in the sequence, and transfers at least some of this to Bob. The preceding transaction 152i is labelled "$Tx_0$" in FIG. 3. $Tx_0$ and $Tx_1$ are just arbitrary labels. They do not necessarily mean that $Tx_0$ is the first transaction in the blockchain, nor that $Tx_1$ is the immediate next transaction in the pool. $Tx_1$ could point back to any preceding (i.e. antecedent) transaction that still has an unspent output 203 locked to Alice.

The preceding transaction $Tx_0$ may already have been validated and included in the blockchain at the time when Alice creates her new transaction $Tx_1$, or at least by the time she sends it to the network 106. It may already have been included in one of the blocks at that time, or it may be still waiting in the pool 154 in which case it will soon be included in a new block. Alternatively $Tx_0$ and $Tx_1$ could be created and sent to the blockchain network together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network, or arrive at any given node. Nevertheless, a subsequent transaction (the descendent transaction or "child") which points to a preceding transaction (the antecedent transaction or "parent") will not be validated until and unless the parent transaction is validated. A child that arrives at a node before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital token represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTX_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig P_A><P_A>||[Checksig\ P_A]$$

where "||" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ in order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node of the blockchain network is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node deems $Tx_1$ valid. If it is a mining node, this means it will add it to the pool of transactions awaiting proof-of-work. If it is a forwarding node, it will forward the transaction $Tx_1$ to one or more other nodes in the blockchain network, so that it will be propagated throughout the network. Once $Tx_1$ has been validated and included in the blockchain, this defines $UTXO_0$ from $Tx_0$ as spent. Note that $Tx_1$ can only be valid if it spends an unspent transaction output 203. If it attempts to spend an output that has already been spent by another transaction, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions. In practice a given node 104 may maintain a separate database marking which UTXOs 203 in which transactions have been spent, but ultimately what defines whether a UTXO has been spent is whether it has already formed a valid input to another valid transaction in the blockchain.

If the total amount specified in all the outputs 203 of a given transaction is greater than the total amount pointed to by all its inputs 202, this is another basis for invalidity in most transaction models. Therefore such transactions will not be propagated nor mined into blocks.

Note that the script code is often represented schematically (i.e. not the exact language). For example, one may write [Checksig $P_A$] to mean [Checksig $P_A$]=OP_DUP OP_HASH160 <H($P_A$)>OP_EQUALVERIFY OP_CHECKSIG. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain that the condition for a UTXO to be redeemed comprises authenticating a signature. More generally the scripting language could be used to define any one or more conditions. Hence the more general terms "locking script" and "unlocking script" may be preferred.

According to some embodiments of the present invention, the signature generated by the coordinator 101 may be used to sign a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key.

Represented in script, the "locking script" and "unlocking script" may take the following forms:

Locking script=OP_DUP OP_HASH160<Public
KeyHash>OP_EQUAL OP_CHECKSIG
Unlocking script=<Signature><Public Key>

Referring to the above described embodiments, the <Public Key> may be equated to P=a·G, and the <Signature> comprises the threshold signature s, where the previous transaction is the message to be signed. Note that as stated above, ECDSA signatures are in the form (r, s).

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the Board of a company. Voting matters of the company may require a majority of the Board (i.e. at least three participants) to agree on the particular vote. The Board may use the described signature generation method to prove that at least three Board members agreed to vote in favour of a particular outcome. In this example, the threshold of the signature generation scheme is three. That is, at least three of the Board members must provide a respective signature share in order for the co-ordinator to successfully generate a signature. If a signature is generated successfully, at least the threshold number (i.e. three) of Board members must have agreed to vote in favour of that outcome. Thus the successful generation of a signature acts as a record of the vote and proves that a majority of the Board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key.

One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key. This introduces a single point of failure. That is, if a malicious party can gain access to the private key used by the certificate authority to issue digital certificates, the malicious party can then issue fraudulent certificates. A particular example of a certificate authority being targeted is DigiNotar, a Dutch certificate authority. The private key used by DigiNotar was compromised in 2011 and used to issue fraudulent certificates. This attack was possible as the attacker needed only to obtain a single piece of data, i.e. the private key. However, this attack would not have been possible (or at least made more difficult) if the certificate authority (DigiNotar) used a threshold signature scheme according to the present invention. In order to issue certificates, an attacker must acquire the threshold number of key shares (or signature shares) required for generating the signature.

It will be appreciated that the above embodiments have been described by way of example only. More generally there may be provided a method, apparatus or program in accordance with any one or more of the following Statements.

Statement 1. A computer-implemented method of identifying a denial-of-service attack during a threshold signature scheme, wherein each participant of a group of participants has a respective share of a first shared secret and a respective share of a second shared secret, wherein the method is performed by a first participant of the group and comprises: calculating a first target share based on at least a first share of the first shared secret and a first share of the second shared secret, wherein the first target share is used to calculate a first signature share of a threshold signature; calculating a target value based on the first target share and a first predetermined amount of other target shares, wherein each other target share is calculated by a respective participant; calculating a target public key corresponding to the target value; calculating a first verification share based on the first share of the first shared secret and a public key corresponding to the second shared secret; calculating a verification public key based on at least the first verification share and a second predetermined amount of other verification shares, wherein each other verification share is calculated by a respective participant; and determining whether at least one other participant is attempting a denial-of-service attack based on whether the verification public key matches the target public key.

A threshold number of different signature shares from respective participants of a group of participants are required to generate the digital signature.

The target value may be calculated by interpolating over the first target share and the first predetermined amount of other target shares. The verification public key may be calculated by performing elliptic curve interpolation over the first verification share and the second predetermined amount of other verification shares.

Statement 2. The method of statement 1, comprising sharing the first target share and the first verification share with the other participants in the group.

Statement 3. The method of statement 2, wherein said sharing comprises broadcasting the first target share and/or the first verification share to the other participants in the group.

Alternatively, the first target share and/or the first verification share may be transmitted directly to each other participant, e.g. over respective secure communication channels.

Statement 4. The method of any preceding statement, comprising: obtaining the first predetermined amount of other target shares from the respective participants; and obtaining the second predetermined amount of other verification shares from the respective participants.

Statement 5. The method of any preceding statement, wherein the first share of the first shared secret is calculated by performing a first instance of a joint verification random secret sharing scheme (JVRSS) with the group of participants.

Statement 6. The method of any preceding statement, wherein the first share of the second shared secret is calculated by performing a second instance of JVRSS with the group of participants.

Statement 7. The method of statement 6, wherein the public key corresponding to the second shared secret is calculated based on the obfuscated coefficients shared by each participant when performing the second instance of JVRSS.

Statement 8. The method of any preceding statement, wherein each participant is associated with a respective index of a sequence, wherein the first predetermined amount of other target shares are calculated by those other participants with respective indices following the index of the first participant, and wherein the second predetermined amount of other verification shares are calculated by those other participants with respective indices following the index of the first participant.

Statement 9. The method of any preceding statement, wherein the group has a size N≥2t+1 wherein the threshold of the first shared secret and of the threshold signature is t+1, and wherein t is the degree of the first shared secret. Here, t is the degree of the shared secret polynomial.

In some examples, the first and second shared secrets may have different thresholds. In some examples, the first shared secret and the threshold signature may have different thresholds. For instance, the threshold of the threshold signature may be greater than that of the first shared secret. E.g. the threshold of the signature may be t+2 and the threshold of the first shared secret may be t+1.

Statement 10. The method of statement 9, wherein the first predetermined amount is 2t and wherein the second predetermined amount is t.

Statement 11. The method of statement 9 or statement 10, wherein the group has a size N>2t+1, wherein said calculating of the verification public key comprises calculating a plurality of verification public keys, each verification public key being calculated based on the first verification share and a different second predetermined amount of other verification shares, and wherein the method comprises: comparing each of the plurality of verification public keys; and identifying at least one participant attempting a denial-of-service attack as the participant whose respective verification share results in a verification public key that does not match at least one other verification public key.

Statement 12. The method of any preceding statement, wherein the first shared secret is a first blinding key, wherein the second shared secret is an ephemeral key, and wherein the first target share is a multiplicative share.

Statement 13. The method of any of statements 1 to 11, wherein each participant of the group of participants has a respective share of a third shared secret, wherein the first target share is calculated based on a first share of the first shared secret, and wherein the verification public key is calculated based on a public key corresponding to the third shared secret.

Statement 14. The method of statement 13, wherein the first shared secret is an inverse ephemeral key, the second shared secret is a private key, the third shared secret is a second blinding key, and the first target share is a first intermediary share.

Statement 15. The method of statement 13 or statement 14, wherein the first share of the third shared secret is calculated by performing a third instance of JVRSS with the group of participants.

Statement 16. The method of statement 6, wherein the public key corresponding to the third shared secret is calculated based on the obfuscated coefficients shared by each participant when performing the third instance of JVRSS.

Statement 17. The method of any preceding statement, comprising only using the first target share and/or the target value to calculate the first signature share on condition that the verification public key matches the target public key.

For instance, the multiplicative share may be used to calculate an inverse ephemeral key share.

Statement 18. Computer equipment comprising: memory comprising one or more memory units; and processing apparatus comprising one or more processing units, wherein the memory stores code arranged to run on the processing apparatus, the code being configured so as when on the processing apparatus to perform the method of any of statements 1 to 17.

Statement 19. A computer program embodied on computer-readable storage and configured so as, when run on computer equipment to perform the method of any of statements 1 to 17.

Statement 20. A computer-implemented method of identifying a denial-of-service attack during a threshold signature scheme, wherein each participant of a group of participants has a respective share of a shared private key, a respective share of an ephemeral private key, a respective share of a first blinding key, and a respective share of a second blinding key, wherein the method is performed by a first participant of the group and comprises: calculating a first public key corresponding to a first inverse ephemeral private key share, wherein first public key is calculated based on i) an inverse of a product of the ephemeral private key and the first blinding key, and ii) a public key corresponding to a first share of the first blinding key; calculating a second public key corresponding to a pre-signature share, wherein the second public key is calculated based on i) a public key corresponding to an intermediary value and ii) a public key corresponding to a first share of the second blinding key, wherein the intermediary value is based on i) an inverse of the ephemeral private key, ii) the private key and iii) the second blinding key; and sending the first public key and the second public key to a coordinating party, wherein the coordinating party has access to a first signature share calculated by the first participant, and wherein the first signature share is calculated based on i) a first share of the ephemeral private key, ii) a message, iii) a public key corresponding to the shared private key, and iv) a first share of the second blinding key.

Statement 21. The method of statement 20, wherein some or all of the respective shares are calculated using respective instances of a joint verifiable random secret sharing (JVRSS) scheme.

Statement 22. The method of statement 21 or statement 22, comprising calculating the inverse of the product of the ephemeral private key and the first blinding key.

Statement 23. The method of any preceding statement, comprising calculating the intermediary value based on a first intermediary share and a respective intermediary share from each other participant.

Statement 24. The method of statement 23, comprising calculating the public key corresponding to the intermediary value.

Statement 25. The method of any preceding statement, comprising calculating the public key corresponding to the first share of the first blinding key.

Statement 26. The method of any preceding statement, comprising calculating the public key corresponding to the first share of the second blinding key.

Statement 27. The method of any preceding statement, comprising: calculating the first signature share; and sending the first signature share to the coordinating party Statement 28. The method of any preceding statement, comprising obtaining the message from the coordinating party.

Statement 29. The method of any of statements 20 to 28, comprising generating the message.

Statement 30. The method of any preceding statement, comprising calculating the public key corresponding to the shared ephemeral private key, and wherein the first signature share is based on a first coordinate of the public key corresponding to the shared ephemeral private key. E.g. the x-coordinate.

Statement 31. A computer-implemented method of identifying a denial-of-service attack, wherein each participant of a group of participants has a respective share of a private key, a respective share of an ephemeral private key, a respective share of a first blinding key, and a respective share of a second blinding key, and wherein the method is performed by a coordinating party configured to generate a signature based on a threshold number of signature shares, and comprises: receiving a first public key from a first participant; receiving a second public key from the first participant; receiving a first signature share from the first participant; calculating a public key corresponding to a first candidate signature share based on i) the first public key, ii) a message, iii) a public key corresponding to the shared ephemeral private key, and iv) the second public key; and determining whether the first participant is attempting a denial-of-service attack based on whether a public key corresponding to the first signature share matches the public key corresponding to the first candidate signature share.

E.g. the public key corresponding to the candidate first signature share is generated by obfuscating the candidate first signature share with the generator point G.

Statement 32. A computer-implemented method of identifying a denial-of-service attack, wherein each participant of a group of participants has a respective share of a private key, a respective share of an ephemeral private key, a respective share of a first blinding key, and a respective share of a second blinding key, and wherein the method is performed by a coordinating party configured to generate a signature based on a threshold number of signature shares, and comprises: calculating a first public key corresponding to a first inverse ephemeral private key share of a first participant; calculating a second public key corresponding to a pre-signature share of the first participant; receiving a first signature share from the first participant; calculating a public key corresponding to a candidate first signature share based on i) the first public key, ii) a message, iii) a public key corresponding to the shared ephemeral private key, and iv) the second public key; and determining whether the first participant is attempting a denial-of-service attack based on whether a public key corresponding to the first signature share matches the public key corresponding to the candidate first signature share.

The coordinator may calculate a respective first public key and respective second public key for some or all of the other participants. This allows the coordinator to determine whether those other participants are attempting a denial-of-service attack.

The coordinating party may be a participant of the group.

Statement 33. The method of statement 31 or statement 32, comprising, on condition that the public key corresponding to the first signature matches the public key corresponding to the candidate first signature share, using the first signature share to calculate a signature based on the first signature and one or more additional signature shares calculated by respective participants of the group.

Statement 34. The method of statement 33, comprising: using the first signature share to calculate a signature based on the first signature share and one or more additional signature shares calculated by respective participant of the group, wherein the first signature share is received prior to said receiving or calculating of the first public key and the second public key; determining whether the signature is an invalid signature; and performing said determining of whether the first participant is attempting a denial-of-service attack in response to determining that the signature is an invalid signature.

Statement 35. The method of statement 34, wherein said determining of whether the signature is an invalid signature comprises verifying the signature against the public key corresponding to the shared private key.

Statement 36. Computer equipment comprising: memory comprising one or more memory units; and processing apparatus comprising one or more processing units, wherein the memory stores code arranged to run on the processing apparatus, the code being configured so as when on the processing apparatus to perform the method of any of statements 20 to 35.

Statement 37. A computer program embodied on computer-readable storage and configured so as, when run on computer equipment to perform the method of any of statements 20 to 35.

According to another aspect disclosed herein, there may be provided a method comprising the actions of some or all of: the first participant, some or all of the other participants, and the coordinator.

According to another aspect disclosed herein, there may be provided a system comprising the computer equipment some or all of: the first participant, some or all of the other participants, and the coordinator.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of identifying a denial-of-service attack during a threshold signature scheme, wherein each participant of a group of participants has a respective share of a first shared secret and a respective share of a second shared secret, wherein the method is performed by a first participant of the group and comprises:
    calculating a first target share based on at least a first share of the first shared secret and a first share of the second shared secret, wherein the first target share is used to calculate a first signature share of a threshold signature;
    calculating a target value based on the first target share and a first predetermined amount of other target shares, wherein each other target share is calculated by a respective participant;
    calculating a target public key corresponding to the target value;
    calculating a first verification share based on the first share of the first shared secret and a public key corresponding to the second shared secret;
    calculating a verification public key based on at least the first verification share and a second predetermined amount of other verification shares, wherein each other verification share is calculated by a respective participant; and
    determining whether at least one other participant is attempting a denial-of-service attack based on whether the verification public key matches the target public key.

2. The method of claim 1, comprising sharing the first target share and the first verification share with the other participants in the group.

3. The method of claim 2, wherein said sharing comprises broadcasting the first target share and/or the first verification share to the other participants in the group.

4. The method of claim 1, comprising:
    obtaining the first predetermined amount of other target shares from the respective participants; and
    obtaining the second predetermined amount of other verification shares from the respective participants.

5. The method of claim 1, wherein the first share of the first shared secret is calculated by performing a first instance of a joint verification random secret sharing scheme (JVRSS) with the group of participants.

6. The method of claim 1, wherein the first share of the second shared secret is calculated by performing a second instance of JVRSS with the group of participants.

7. The method of claim 6, wherein the public key corresponding to the second shared secret is calculated based on obfuscated coefficients shared by each participant when performing the second instance of JVRSS.

8. The method of claim 1, wherein each participant is associated with a respective index of a sequence, wherein the first predetermined amount of other target shares are calculated by those other participants with respective indices following the index of the first participant, and wherein the second predetermined amount of other verification shares are calculated by those other participants with respective indices following the index of the first participant.

9. The method of claim 1, wherein the group has a size $N \geq 2t+1$ wherein the threshold of the first shared secret and of the threshold signature is $t+1$, and wherein t is the degree of the first shared secret.

10. The method of claim 9, wherein the first predetermined amount is 2t and wherein the second predetermined amount is t.

11. The method of claim 9, wherein the group has a size $N > 2t+1$, wherein said calculating of the verification public key comprises calculating a plurality of verification public keys, each verification public key being calculated based on the first verification share and a different second predetermined amount of other verification shares, and wherein the method comprises:
   comparing each of the plurality of verification public keys; and
   identifying at least one participant attempting a denial-of-service attack as the participant whose respective verification share results in a verification public key that does not match at least one other verification public key.

12. The method of claim 1, wherein the first shared secret is a first blinding key, wherein the second shared secret is an ephemeral key, and wherein the first target share is a multiplicative share.

13. The method of claim 1, wherein each participant of the group of participants has a respective share of a third shared secret, wherein the first target share is calculated based on a first share of the first shared secret, and wherein the verification public key is calculated based on a public key corresponding to the third shared secret.

14. The method of claim 13, wherein the first shared secret is an inverse ephemeral key, the second shared secret is a private key, the third shared secret is a second blinding key, and the first target share is a first intermediary share.

15. The method of claim 13, wherein the first share of the third shared secret is calculated by performing a third instance of JVRSS with the group of participants.

16. The method of claim 15, wherein the public key corresponding to the third shared secret is calculated based on obfuscated coefficients shared by each participant when performing the third instance of JVRSS.

17. The method of claim 1, comprising only using the first target share and/or the target value to calculate the first signature share on condition that the verification public key matches the target public key.

18. Computer equipment comprising:
memory comprising one or more memory units; and
processing apparatus comprising one or more processing units, wherein the memory stores code arranged to run on the processing apparatus, the code being configured so as when run on the processing apparatus, the processing apparatus performs a method of identifying a denial-of-service attack during a threshold signature scheme, wherein each participant of a group of participants has a respective share of a first shared secret and a respective share of a second shared secret, wherein the method is performed by a first participant of the group and comprises:
calculating a first target share based on at least a first share of the first shared secret and a first share of the second shared secret, wherein the first target share is used to calculate a first signature share of a threshold signature;
calculating a target value based on the first target share and a first predetermined amount of other target shares, wherein each other target share is calculated by a respective participant;
calculating a target public key corresponding to the target value;
calculating a first verification share based on the first share of the first shared secret and a public key corresponding to the second shared secret;
calculating a verification public key based on at least the first verification share and a second predetermined amount of other verification shares, wherein each other verification share is calculated by a respective participant; and
determining whether at least one other participant is attempting a denial-of-service attack based on whether the verification public key matches the target public key.

19. A non-transitory computer-readable storage media storing computer program thereon and configured so as, when run on computer equipment, the computer equipment performs a method of identifying a denial-of-service attack during a threshold signature scheme, wherein each participant of a group of participants has a respective share of a first shared secret and a respective share of a second shared secret, wherein the method is performed by a first participant of the group and comprises:
calculating a first target share based on at least a first share of the first shared secret and a first share of the second shared secret, wherein the first target share is used to calculate a first signature share of a threshold signature;
calculating a target value based on the first target share and a first predetermined amount of other target shares, wherein each other target share is calculated by a respective participant;
calculating a target public key corresponding to the target value;
calculating a first verification share based on the first share of the first shared secret and a public key corresponding to the second shared secret;
calculating a verification public key based on at least the first verification share and a second predetermined amount of other verification shares, wherein each other verification share is calculated by a respective participant; and
determining whether at least one other participant is attempting a denial-of-service attack based on whether the verification public key matches the target public key.

* * * * *